(12) United States Patent
Shveidel et al.

(10) Patent No.: US 11,886,427 B1
(45) Date of Patent: Jan. 30, 2024

(54) TECHNIQUES FOR EFFICIENT JOURNAL SPACE HANDLING AND RECOVERY PROCESSING WITH MULTIPLE LOGS

(71) Applicant: Dell Products L.P., Hopkinton, MA (US)

(72) Inventors: Vladimir Shveidel, Pardes-Hana (IL); Dror Zalstein, Givatayim (IL); Bar David, Tel Mond (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/959,204

(22) Filed: Oct. 3, 2022

(51) Int. Cl.
*G06F 16/23* (2019.01)
(52) U.S. Cl.
CPC .................. *G06F 16/2379* (2019.01)
(58) Field of Classification Search
CPC .................................................. G06F 16/2379
See application file for complete search history.

(56) References Cited

U.S. PATENT DOCUMENTS

2020/0125449 A1* 4/2020 Mao ............... G06F 11/1466
2020/0125656 A1* 4/2020 Li .................. G06F 11/1469

OTHER PUBLICATIONS

U.S. Appl. No. 16/260,660, filed Jan. 29, 2019, entitled System and Method for Aggregating Metadata Changes in a Storage System, to Vladimir Shveidel, et al.
U.S. Appl. No. 16/818,008, filed Mar. 13, 2020, entitled System and Method of Handling Journal Space in a Storage Cluster With Multiple Delta Log Instances, to Vladimir Shveidel, et al.

* cited by examiner

*Primary Examiner* — Cam-Y T Truong
(74) *Attorney, Agent, or Firm* — Muirhead and Saturnelli, LLC

(57) ABSTRACT

In at least one embodiment, processing can include: receiving a request for a transaction of MD (metadata) updates including a first MD update of a first MD update type of a first set and including a second MD update of a second MD update type of a second set; storing, in a first volatile MD log, the first MD update; storing, in a second volatile MD log, the second MD update; storing, in a first non-volatile MD log, the first MD update; and storing, in a second non-volatile MD log, the second MD update, wherein each MD update of the first volatile MD log and the first non-volatile MD log has a corresponding MD update type of the first set, and each MD update of the second volatile MD log and the second non-volatile MD log has a corresponding MD update type of the second set.

19 Claims, 15 Drawing Sheets

TECHNIQUES FOR EFFICIENT JOURNAL SPACE HANDLING AND RECOVERY PROCESSING WITH MULTIPLE LOGS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a first node of a system, a request, wherein the request is a transaction comprising a plurality of MD (metadata) updates including a first MD update of a first MD update type and including a second MD update of a second MD update type, wherein the first MD update type is included in a first set of MD update types, and wherein the second MD update type is included in a second set of MD update types; storing, in a first volatile MD log, the first MD update; storing, in a second volatile MD log, the second MD update; storing, in a first non-volatile MD log, the first MD update; and storing, in a second non-volatile MD log, the second MD update, wherein each MD update stored in the first volatile MD log and the first non-volatile MD log has a corresponding MD update type included in the first set, and wherein each MD update stored in the second volatile MD log and the second non-volatile MD log has a corresponding MD update type included in the second set. A set intersection of the first set of MD update types and the second set of MD update types can be null such that each MD update type in the first set is not included in the second set and each MD update type in the second set is not included in the first set. Each entry in the first volatile MD log can have a corresponding entry in the first non-volatile MD log, and wherein each entry in the second volatile MD log can have a corresponding entry in the second non-volatile MD log.

In at least one embodiment, the system can include the first node and a second node, wherein the first volatile MD log and the second volatile MD log can be local to the first node and can be included in a first volatile memory of the first node. The second node can perform said storing, in a first non-volatile MD log, the first MD update. The second node can perform said storing, in a second non-volatile MD log, the second MD update. The second node can include a third volatile MD log and a fourth MD log included in second volatile memory which is local to the second node. Processing can include storing, by the second node, the first MD update in the third volatile MD log; and storing, by the second node, the second MD update in the fourth volatile MD log, wherein each MD update stored in the third volatile MD log has a corresponding MD update type included in the first set, and wherein each MD update stored in the fourth volatile MD log has a corresponding MD update type included in the second set.

In at least one embodiment, the first non-volatile MD log can include a first transaction record which comprises an entry for the first MD update, and wherein the second non-volatile MD log can include a second transaction record which comprises an entry for the second MD update, wherein the first transaction record and the second transaction record can each include a same global sequence identifier (ID) and can each include a same node-specific transaction ID. The first node can be an initiator of the transaction corresponding to the request and the initiator of the transaction can allocate and assigns the transaction a unique node-specific transaction ID from a node-specific transaction ID sequence. One of the first node and the second node can be designated as a primary node and can allocate and assigns the transaction a unique global sequence ID.

In at least one embodiment, the first node can be an initiator of the transaction and processing can include: the first node sending a commit message to the second node, wherein the commit message includes a first node-specific transaction ID generated by the first node and assigned to the transaction; and responsive to receiving the commit message, the second node performing first processing including: the second node performing said storing, in the first non-volatile MD log, the first MD update, and the second node performing said storing, in the second non-volatile MD log, the second MD update, wherein the first MD update is included in a first transaction record of the first non-volatile MD log, wherein the first transaction record includes the first node-specific transaction ID, wherein the second MD update is included in a second transaction record of the second non-volatile MD log, wherein the second transaction record includes the first node-specific transaction ID. The second node can fail to return an acknowledgement to the first node regarding completion of processing of the commit message, and wherein responsive to failing to receive the acknowledgement of the commit message from the second node, the first node can perform second processing including: the first node storing, in a third transaction record of the first non-volatile MD log, the first MD update wherein the third transaction record includes the first node-specific transaction ID; and the first node storing, in a fourth transaction record of the second non-volatile MD log, the second MD update wherein the fourth transaction record includes the first node-specific transaction ID.

In at least one embodiment, processing can include determining that a first pair of transaction records, including the first transaction record and the second transaction record, is a duplicate of a second pair of transaction records, including the third transaction record and the fourth transaction records, wherein said determining determines that the first pair and the second pair are duplicates in accordance with the first transaction record, the second transaction record, the third transaction record and the fourth transaction record each including the first node-specific transaction ID. Processing can include discarding and/or invalidating one of the first pair and the second pair.

In at least one embodiment, the first MD update can be stored in a first transaction record of the first non-volatile MD log, the second MD update can be stored in a second transaction record of the second non-volatile MD log, the system can include a second node, a system event can causes the first node and the second node to reboot, the first node can complete rebooting and restarting prior to the second node, and the first node can perform first processing to recover MD updates from the first non-volatile MD log and the second non-volatile MD log. The first processing can include restoring MD updates from the first non-volatile MD log to the first volatile MD log of the first node, and restoring MD updates from the second non-volatile MD log to the second volatile MD log. The first processing can include: receiving the first transaction record from the first non-volatile MD log; determining whether the first transaction record has a valid corresponding transaction record in the second non-volatile MD log; and responsive to determining the first transaction record has a valid corresponding transaction record in the second non-volatile MD log, performing second processing including: determining whether the first transaction record and the valid corresponding transaction record denote a first pair which is a duplicate transaction of a second pair of transaction records, wherein the second pair of transaction records includes a transaction record from each of the first non-volatile MD log and the second non-volatile MD log; and responsive to determining the first pair is not a duplicate of the second pair, populating the first volatile MD log and the second volatile MD log of the first node in accordance with MD updates of the first pair, and otherwise discarding and invalidating the first pair.

In at least one embodiment, the first processing can include: determining whether a third transaction record of the first non-volatile MD log is not associated with a counterpart transaction record of the second non-volatile MD log; and responsive to determining the third transaction record is not associated with a counterpart transaction record of the second non-volatile MD log, determining that the third transaction record denotes a second transaction with only MD updates stored in the first non-volatile MD log and not the second non-volatile MD log and populating the first volatile MD log of the first node with MD updates of the third transaction record.

In at least one embodiment, the first processing can include: determining whether a third transaction record of the first non-volatile MD log is part of a disconnected pair where a counterpart transaction record of the second non-volatile MD log has already been destaged from the second non-volatile MD log; and responsive to determining the third transaction record is part of a disconnected pair, populating the first volatile MD log of the first node with MD updates of the third transaction record. A third transaction record can be included in a second transaction, wherein an initiator can be one of the first node and the second node and a non-initiator can be a remaining one of the first node and the second node which is not the initiator. The first processing can include: determining whether the third transaction record of the first non-volatile MD log is part of a torn pair where a counterpart transaction record of the second non-volatile MD log was not persisted due to a failure of the non-initiator, wherein the non-initiator persists the third transaction record and failed prior to persisting the counterpart transaction record to the second non-volatile MD log; and responsive to determining the third transaction record is part of a torn pair, discarding and invaliding the third transaction record and not restoring MD updates of the third transaction record to the first volatile MD log of the first node.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
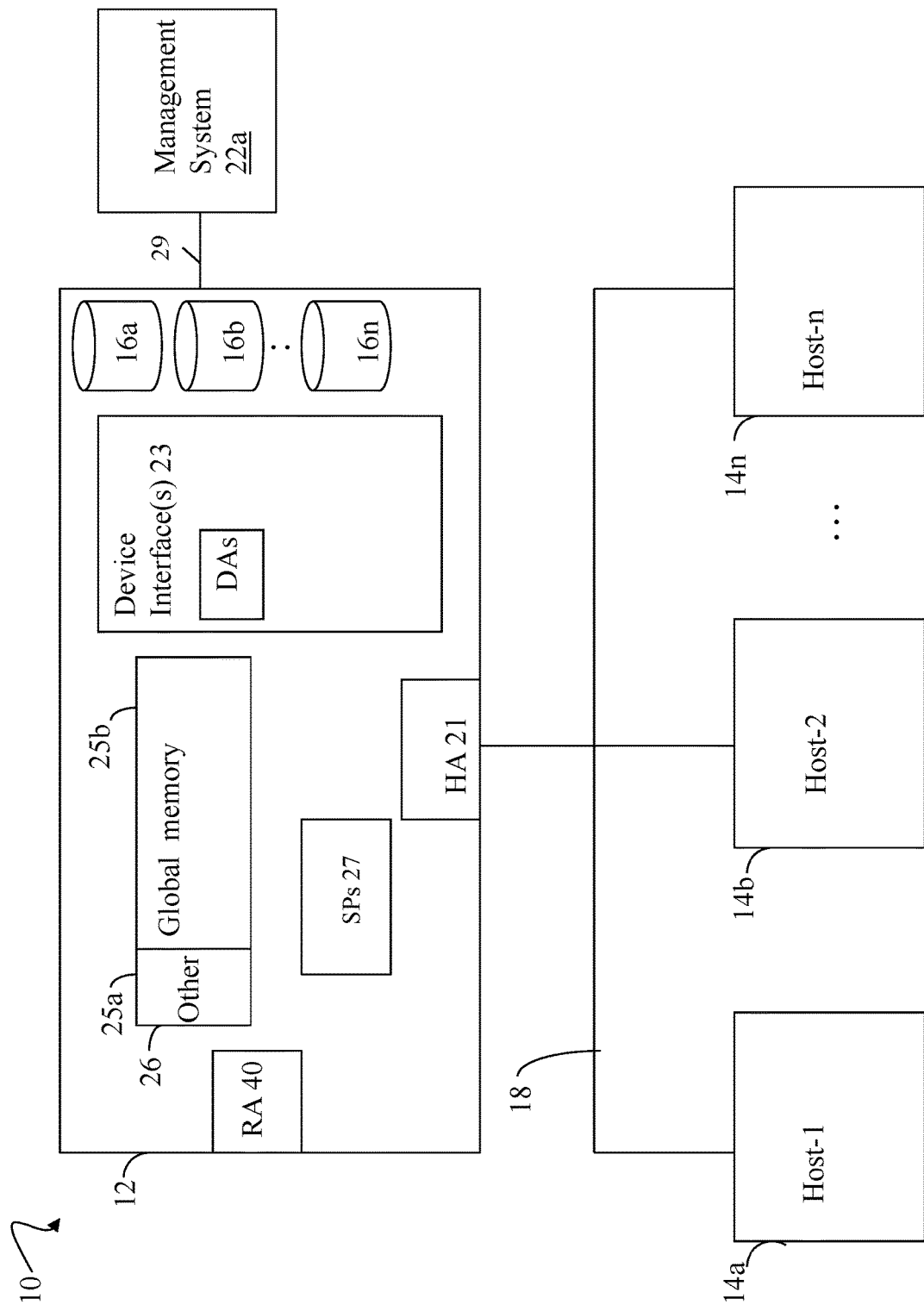
FIG. 1 is an example of components that may be included in a system in accordance with the techniques of the present disclosure.

In at least one existing data storage system with a dual node configuration, each storage node can maintain a single local instance of an in-memory MD (metadata) log where both nodes can share a single instance of a persistently stored MD log. In the event of disaster, data loss and/or data corruption, a storage node can replay the persistently stored MD log to apply the persistently stored MD updates to the node's local in-memory MD log to thereby restore or recover the node's in-memory MD log to a valid and consistent state.

Clients of the MDL (metadata log) infrastructure can differ in terms of the pattern and/or frequency of MD updates. For example, each type of MD update can respectively correspond to a particular MD update type. In at least one existing system, each node can maintain and utilize multiple in-memory MD logs where each of the in-memory MD logs can be optimized for a particular one or more of the MD types.

However, use of the single instance of the shared persistent or non-volatile MD log which is used to persistently store MD updates for multiple in-memory MD logs of each node can have drawbacks. For example, space reclamation for the non-volatile MD log can be indeterministic with dependencies on the different ingest rates of the multiple in-memory MD logs corresponding to the different MD types. Since entries for the different types of MD updates are generally interleaved in the shared non-volatile MDL, it can be quite complex to reclaim space from the shared non-volatile MDL such as when the multiple in-memory MD logs can be destaged at different rates. In at least one system where the shared non-volatile MD log is implemented as a ring buffer, space reclamation within the ring buffer can be complicated in that the tail can only be advanced to reclaim space for logically contiguous or sequential entries with respect to the tail. Thus, for example with reference to FIG. 8, if the tail is currently at entry 3 and MD updates for entries 5-8 but not entry 4 have been flushed, the tail cannot yet be advanced to reclaim any entries of the ring buffer. Tail movement in the foregoing scenario is blocked until entry 4 is flushed where, in response, space or storage associated with the entries 4-8 can be reclaimed with the tail advancing from 3 to 8.

In such cases where the non-volatile memory MD log is implemented as a ring buffer and where the ring buffer's tail movement is blocked such as due to different flushing or destaging rates of the different in-memory MD logs of each node, the non-volatile memory MD log can run low on space potentially resulting in yet other problems within the system. For example, if a free entry cannot be obtained from the non-volatile memory MD log, the system is not able to service operations such as write I/O operations which result in performing one or more MD updates each requiring a free entry in the non-volatile memory MD log.

In such cases where the non-volatile memory MD log's tail movement is blocked resulting in low non-volatile memory MD log space, the system can perform responsive actions in efforts to increase its free space. For example, the actions can include triggering destaging of logged MD updates or increasing the rate of destaging of logged MD updates in order to increase the number of free non-volatile memory MD log entries.

In some systems multiple forms, types or tiers of non-volatile storage can be used to store records of the non-volatile memory MD log, where each such tier can have different performance characteristics. For example in one system, the entries of the non-volatile memory MD log can be stored on one tier or form of persistent memory such as NVRAM (non-volatile random access memory). If the NVRAM used to store entries of the non-volatile memory MD log becomes full, a second slower tier of non-volatile storage can be used to store demoted portions of the non-volatile memory MD log, where such demoted portions can include the oldest MD updates of the non-volatile memory MD log portions stored on NVRAM. Thus, inefficiencies in space reclamation of the non-volatile memory MD log such as hindered or blocked tail movement noted above can result in increasing the rate of demotion of portions of the non-volatile memory MD log from NVRAM to the second slower tier of non-volatile storage.

To address the above-noted problems and drawbacks, rather than a single shared non-volatile memory MD log, the techniques of the present disclosure provide for maintaining and utilizing multiple shared non-volatile memory MD logs which are shared among the multiple nodes of the system but where each of the non-volatile memory MD logs can be used in connection with different in-memory MD logs for different MD update types. In at least one embodiment with a dual node data storage system, each node can maintain multiple in-memory MD logs which can share multiple non-volatile memory MD logs. Each of the multiple non-volatile memory MD logs can be used with one or more different MD update types. For example, two non-volatile memory MD logs can be used in one embodiment where a first of the two non-volatile memory MD logs is used for storing MD updates of a first set of one or more MD update types, and a second of the two non-volatile memory MD logs used for storing MD updates of a second set of one or more MD update types, and where the first set and the second set have no overlap or intersection (e.g., each MD update type in the first set is not included in the second set, and each MD update type included in the second set is not included in the first set). On each node, a first in-memory MD log can be used and optimized for storing MD updates which are of the first set of MD update types and where the first in-memory MD log on each node has corresponding entries persistently stored in the first non-volatile memory MD log shared by the nodes. Additionally on each node, a second in-memory MD log can be used and optimized for storing MD updates which are of the second set of MD update types and where the second in-memory MD log on each node has corresponding entries persistently stored in the second non-volatile memory MD log shared by the nodes. In at least one embodiment, there can be more than two in-memory MD logs on each node and thus more than two corresponding non-volatile memory MD logs shared between the nodes.

The techniques of the present disclosure can be used to promote efficiencies by avoiding or reducing early destaging of logged MD updates, avoiding or reducing the amount of volatile memory used for the in-memory MD log, reducing the overall amount of space or storage used for the non-volatile memory MD logs, and/or reducing the non-volatile memory MD log demotion rate.

The techniques of the present disclosure also include performing processing which provides transactional atomicity of MD updates related to use of the multiple in-memory MD logs on each node. For example, a write I/O can be received at the data storage system from a host where the write I/O overwrites existing data stored at a logical address L1 with new data. The transaction for servicing the write I/O can include performing multiple MD updates which need to be performed atomically. For MD consistency, the foregoing MD updates, along with possibly others, can be performed atomically so that all such MD updates are performed or none of the MD updates are performed. In at least one embodiment in accordance with the techniques of the present disclosure, such transactional atomicity can be maintained across the multiple in-memory MD logs of each node where different MD updates of the same transaction can be stored in different ones of the in-memory MD logs of each single node. In at least one embodiment in accordance with the techniques of the present disclosure, such transactional atomicity can be maintained across the multiple non-volatile memory MD logs or persisted MD logs where MD updates of the same transaction can be stored in both non-volatile memory MD logs in accordance with the particular MD update types associated with each of the non-volatile memory MD logs.

An embodiment in accordance with the techniques of the present disclosure can also perform processing which provides efficient recovery in response to node failover and other events.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25*b*, for example, when communicating with other device interfaces and other components of the data storage array. The other portion 25*a* is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* also through the channels. The host systems 14*a-n* do not address the drives or devices 16*a*-16*n* of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* is a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration is stored in any suitable data storage entity or structure, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
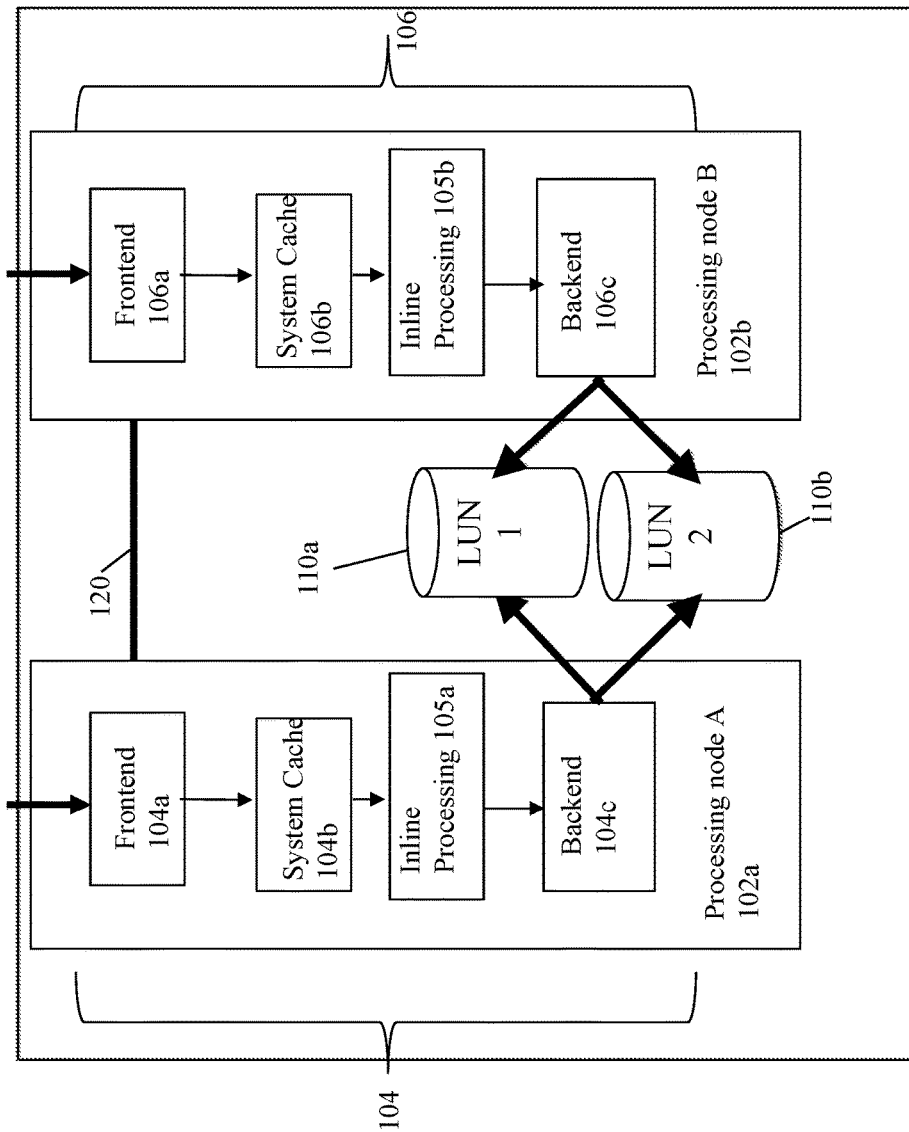
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A.

Figure 3:
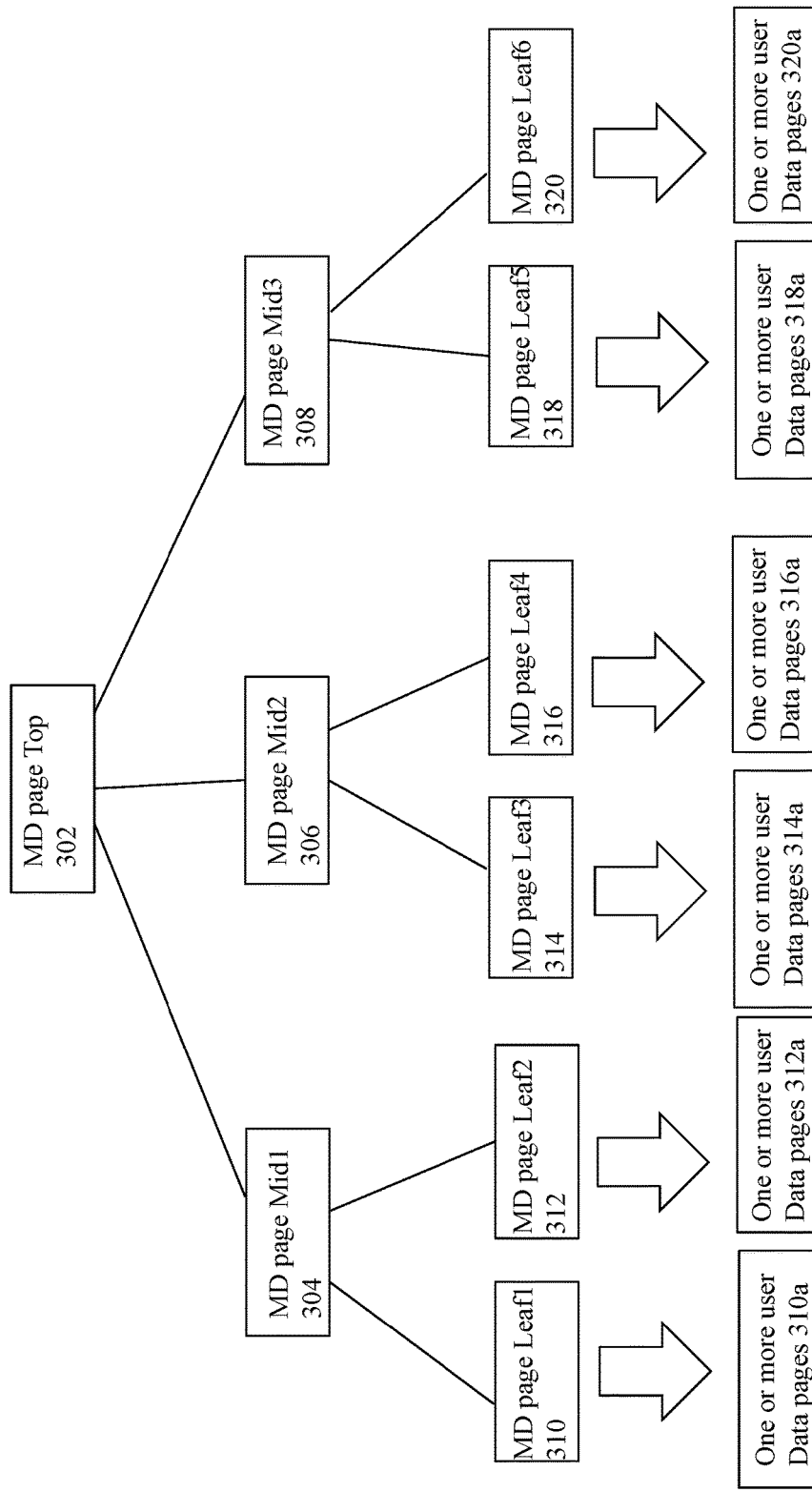
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
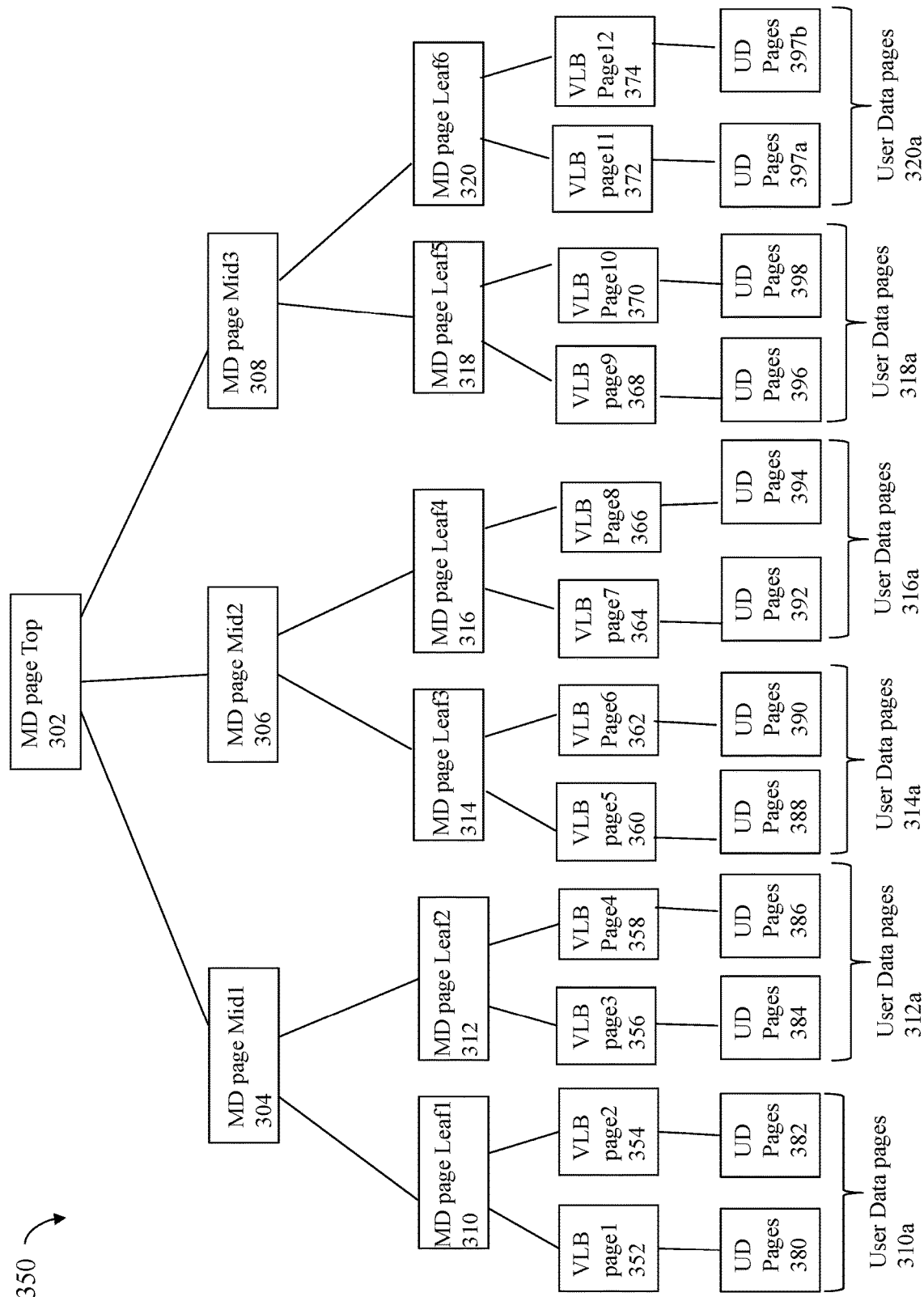

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
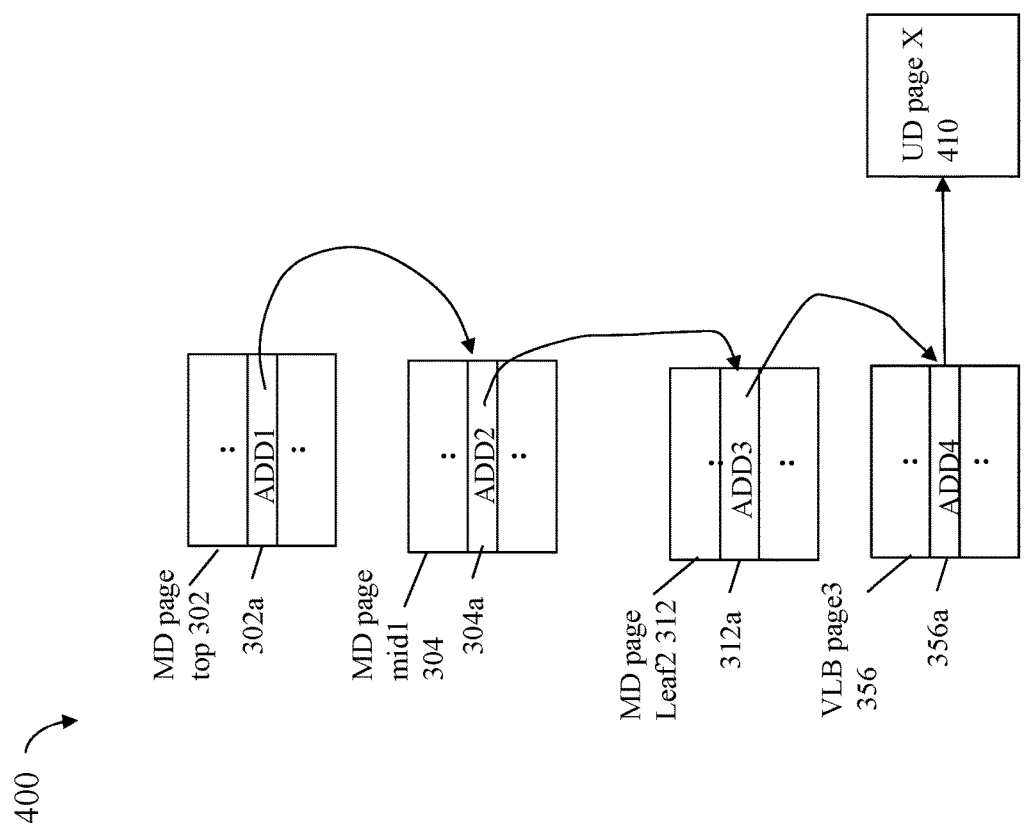

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
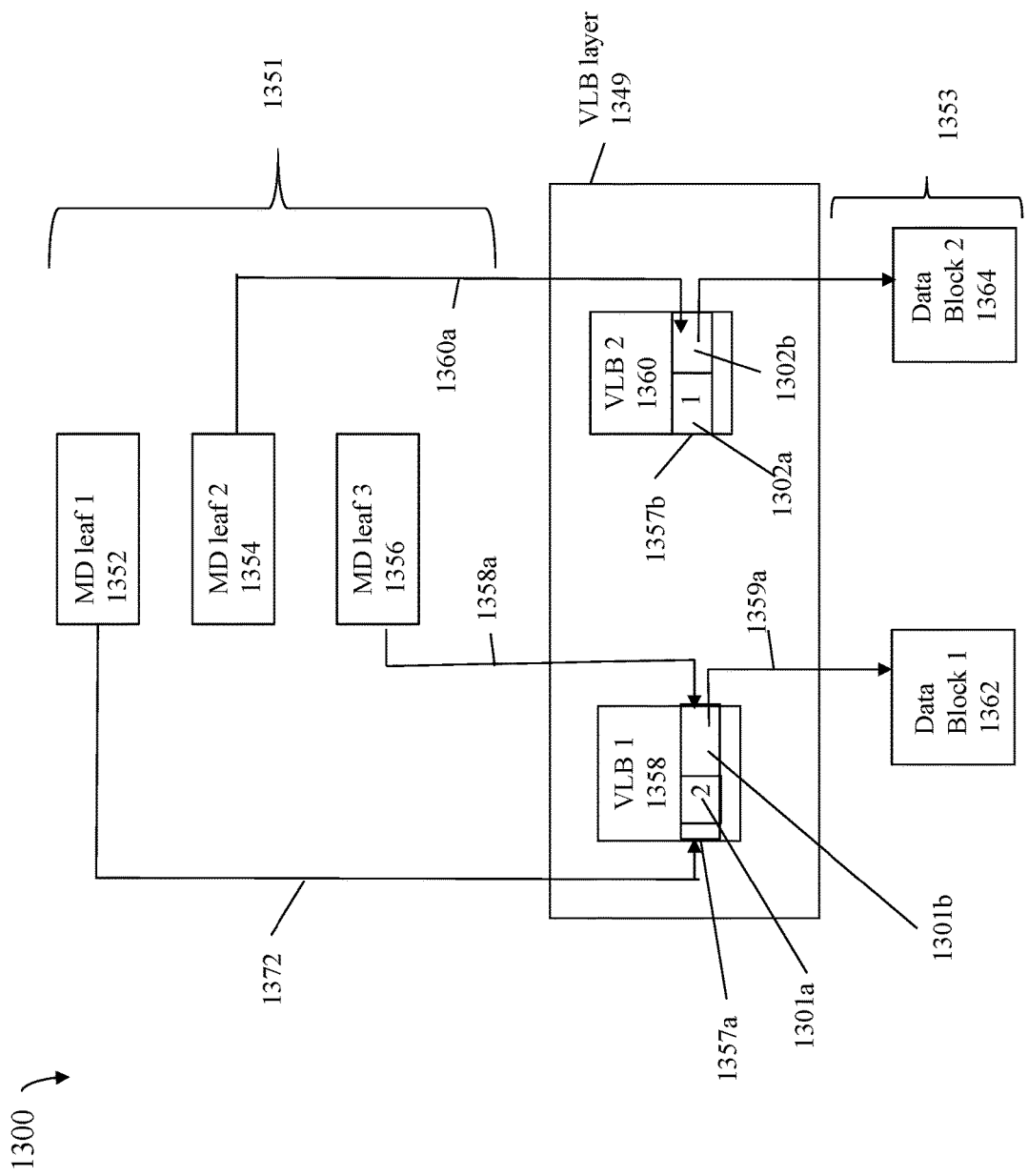

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

In at least one embodiment, the reference count 1301a can be initialized to 0 and used when the associated data block 1362 becomes a candidate for deduplication. As long as the data storage system includes at least one instance of, and thus at least one reference, to the data block 1362, the reference count 1301a will be non-zero. The reference count 1301a becomes zero when all instances of, or references to, the data block 1362 are deleted. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

In at least one embodiment, the reference count 1302a can be initialized to 0 and used when the associated data block 1364 becomes a candidate for deduplication. As long as the data storage system includes at least one instance of, and thus at least one reference, to the data block 1364, the reference count 1302a will be non-zero. The reference count 1302a becomes zero when all instances of, or references to, the data block 1364 are deleted. In this example, the reference 1302a is 1 indicating that there is 1 instances of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
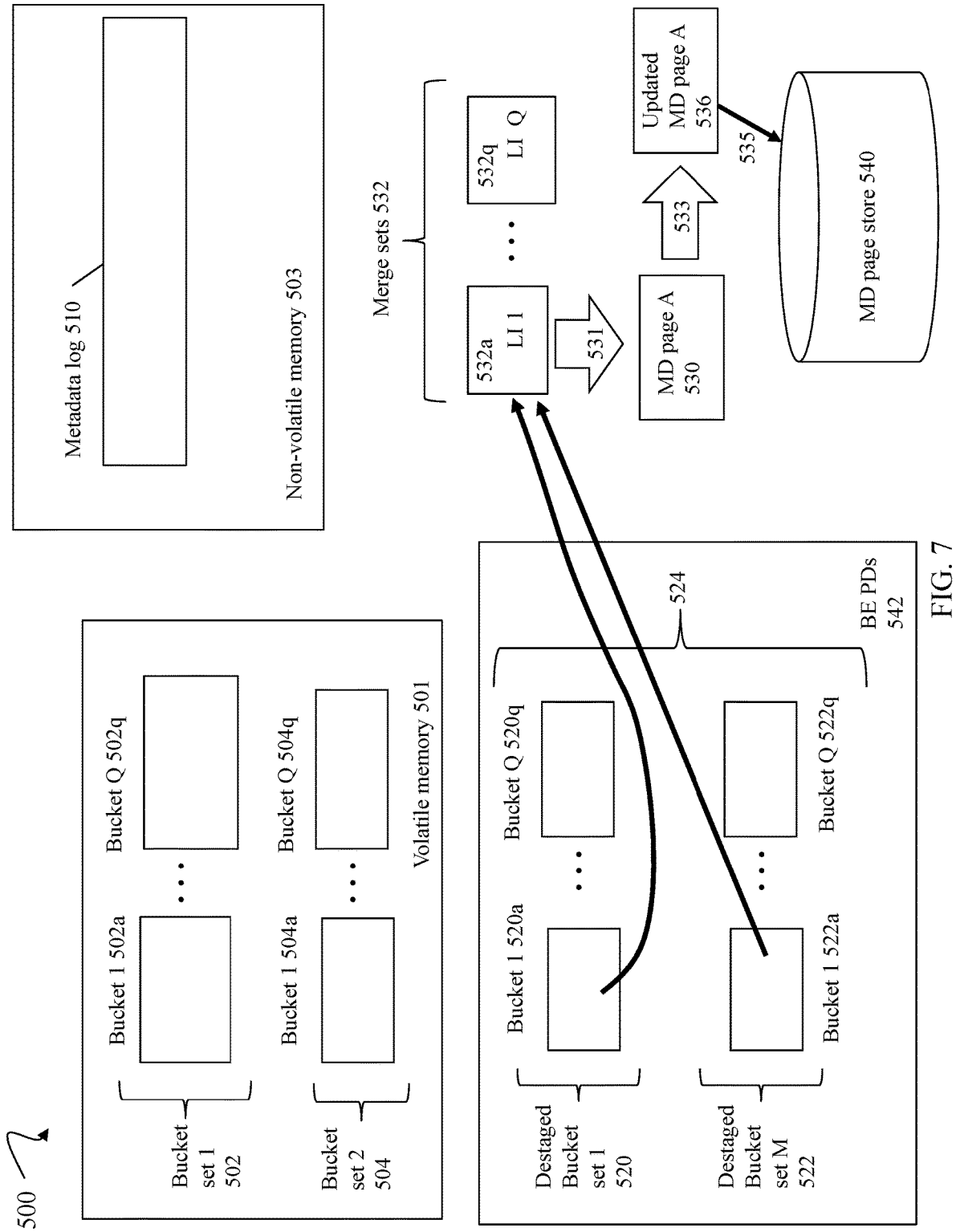
FIG. 7 is an example illustrating structures and associated data flow in at least one embodiment in of a data storage system.

Referring to FIG. 7, shown is an example 500 illustrating structures and associated data flow in at least one embodiment of a data storage system.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, 6 and 7A, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy.

In at least one system, updates to the MD page can be stored in the metadata log, where the logged MD update is persistently stored in the non-volatile memory metadata log 510 (stored in non-volatile storage 503 which can be NVM-RAM) and where the logged MD update is also stored in an in-memory log structure, such as an active one of the bucket sets 502, 504 stored in each node's local volatile memory. In the in-memory log structure in at least one embodiment, each individual update to a particular MD page can be recorded as a separate entry in a bucket of updates associated with the particular MD page. Subsequently, the updates to the MD page as recorded in the in-memory metadata log can be destaged and applied to a persistently stored copy of the MD page. Logging the MD updates such as to the reference count of the MD page can result in improved performance.

In at least one embodiment consistent with other discussion herein, the non-volatile metadata log 510 can be implemented as a ring buffer.

Figure 8:
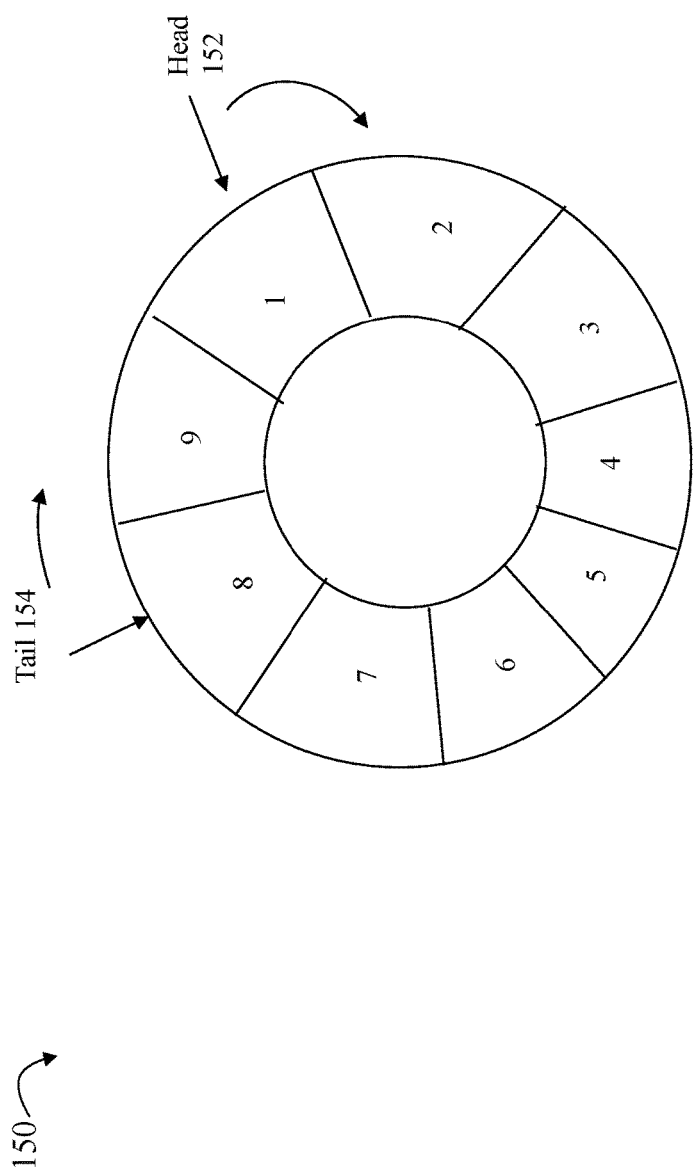
FIG. 8 is an example of a ring buffer structure that can be used in at least one embodiment in accordance with the techniques of the present disclosure.

Referring to FIG. 8, shown is an example 150 illustrating a ring buffer used in implemented the non-volatile metadata log 510 in at least one embodiment in accordance with the techniques of the present disclosure.

The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. The tail pointer 154 can denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array where, for example, the entries 1 through 9 as in FIG. 6 correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 8.

In the following paragraphs, the non-volatile metadata log 510 or the persisted metadata log or journal may also be referred to as an RDL or raw persisted or non-volatile MD data log; and a single bucket set, such as each of 502 and 504, of the volatile in-memory metadata log, may also be referred to an HBSB (hash-based sorted buckets). Thus, consistent with discussion above such as with reference back to FIG. 7, a node can have an active HBSB, such as bucket set 502, and an inactive or destaging HBSB, such as bucket set 504. A pair of HBSBs including an active bucket set and an inactive or destaging bucket set, may also be referred to as an in-memory or volatile memory MD log denoting a single instance of an in-memory MD log. Thus, as shown in FIG. 7, a storage node can write copies of delta updates as tuples to both the in-memory MD log and also the RDL. The RDL can store the respective tuples, deltas or MD updates in a time order sequence such as from older to newest. In contrast, MD updates, deltas or tuples stored in the in-memory MD log local to a storage node can be organized to facilitate efficient and quick retrieval organized in hash buckets as discussed elsewhere herein. Within each hash bucket including MD updates for a single corresponding MD page, the MD updates, deltas or tuples can be organized in any suitable manner such as in a time order sequence based on when the MD updates are received at the storage node.

In at least one existing data storage system such as with a dual node configuration, each storage node can maintain a single local instance of an in-memory MD log where both nodes can share a single instance of the RDL. In the event of disaster, data loss and/or data corruption, a storage node can replay the RDL to apply delta update tuples stored in the RDL to the node's local in-memory MD log to thereby restore or recover the node's in-memory MD log to a valid and consistent state.

Clients of the MDL (metadata log) infrastructure can differ in terms of the pattern and/or frequency of MD updates. For example, each type of MD update can respectively correspond to a tuple with a corresponding type value in the MD update tuple's T field. In at least one existing system, each node can maintain and utilize multiple in-memory MD logs where each of the in-memory MD logs can be optimized for a particular one of the MD types. For example, consistent with other discussion herein, a write transaction for a write I/O such as from a host can include updating a MD leaf pointer to a VLB entry of a VLB, and also updating a reference count such as to perform a "decref" operation to decrease the reference count. In at least one system as discussed above, the reference count can be stored, for example, as a field in the VLB entry. In such a system on each node, a first in-memory MD log can be used which optimizes MD updates of a first type T1 corresponding one type of MD updates such as decrefs, and a second in-memory MD log can be used which optimizes MD updates for a second type T2 corresponding to a second type of MD updates such as updates to entries of MD leaves. In one system, a first in-memory MD log can be used to store MD updates of type T1 corresponding to only decref operation, and a second in-memory MD log can be used to store MD updates of all other MD types. More generally, any suitable number of multiple in-memory MD logs can be used per node, where the two nodes also share a single instance of the RDL.

However, use of the single instance of the shared RDL which is used to persistently store MD updates for both in-memory MD logs of each node can have drawbacks. For example, RDL space reclamation can be indeterministic with dependencies on the different ingest rates of the multiple in-memory MD logs corresponding to the different MD types. Since entries or tuples for the different types of MD updates are generally interleaved in the shared RDL, it can be quite complex to reclaim space from the RDL such as when the multiple in-memory MD logs can be destaged at different rates. In at least one system where the RDL is implemented as a ring buffer as discussed herein, space reclamation within the ring buffer can be complicated in that the tail can only be advanced to reclaim space for logically contiguous or sequential entries with respect to the tail. Thus, for example with reference to FIG. 8, if the tail is currently at entry 3 and MD updates for entries 5-8 but not entry 4 have been flushed, the tail cannot yet be advanced to reclaim any entries of the ring buffer. Tail movement in the foregoing scenario is blocked until entry 4 is flushed where, in response, space or storage associated with the entries 4-8 can be reclaimed with the tail advancing from 3 to 8.

In such cases where the RDL's tail movement is blocked such as due to different flushing or destaging rates of the different in-memory MD logs of each node, the RDL can run low on space potentially resulting in yet other problems within the system. For example, if a free entry cannot be obtained from the RDL, the system is not able to service operations such as write I/O operations which result in performing one or more MD updates each requiring a free entry in the RDL.

In such cases where the RDL's tail movement is blocked resulting low RDL space, the system can perform responsive actions in efforts to increase free RDL space. For example, the actions can include triggering destaging of logged MD updates or increasing the rate of destaging of logged MD updates in order to increase the number of free RDL entries.

In some systems multiple forms, types or tiers of non-volatile storage can be used to store the RDL, where each such tier can have different performance characteristics. For example in one system, the RDL can be stored on one tier or form of persistent memory such as NVRAM. If the NVRAM used to store the RDL becomes full, a second slower tier of non-volatile storage can be used to store demoted portions of the RDL, where such demoted portions can include the oldest MD updates in the RDL portions stored on NVRAM. Thus, inefficiencies in space reclamation of the RDL such as hindered or blocked tail movement noted above can result in increasing the rate of demotion of portions of the RDL from NVRAM to the second slower tier of non-volatile storage.

To address the above-noted problems and drawbacks, rather than a single shared RDL, the techniques of the present disclosure provide for maintaining and utilizing multiple shared RDLs which are shared among the multiple nodes of the system but where each of the RDLs can be used in connection with different in-memory MD logs for different MD update types. In at least one embodiment with a dual node data storage system, each node can maintain multiple in-memory MD logs which can share multiple RDLs. Each of the multiple RDLs can be used with one or more different MD update types. For example, two RDLs can be used in one embodiment where a first of the two RDLs is used for storing MD updates of a first set of one or more MD update types, and a second of the two RDLs used for storing MD updates of a second set of one or more MD update types, and where the first set and the second set have no overlap or intersection (e.g., each MD update type in the first set is not included in the second set, and each MD update type included in the second set is not included in the first set). On each node, a first in-memory MD log can be used and optimized for storing MD updates which are of the first set of MD update types and where the first in-memory MD log on each node has corresponding entries persistently stored in the first RDL shared by the nodes. Additionally on each node, a second in-memory MD log can be used and optimized for storing MD updates which are of the second set of MD update types and where the second in-memory MD log on each node has corresponding entries persistently stored in the second RDL shared by the nodes. In at least one embodiment, the first in-memory MD log of each node and the first RDL can be used for storing decref MD updates having a first MD update type, and the second in-memory MD log of each node and the second RDL can be used for storing all other MD update types. In at least one embodiment, there can be more than two in-memory MD logs on each node and thus more than two corresponding RDLs shared between the nodes.

The techniques of the present disclosure can be used to promote efficiencies by avoiding or reducing early destaging of logged MD updates, avoiding or reducing the amount of volatile memory used for the in-memory MD log, reducing the overall amount of space or storage used for the RDL, and/or reducing the RDL demotion rate.

The techniques of the present disclosure also include performing processing which provides transactional atomicity of MD updates related to use of the multiple in-memory MD logs on each node. For example, a write I/O can be received at the data storage system from a host where the write I/O overwrites existing data stored at a logical address L1 with new data. The transaction for servicing the write I/O can include performing multiple MD updates which need to be performed atomically. To further illustrate, the MD updates of the transaction that are performed atomically can include 1) updating a MD leaf entry to point to a new VLB entry associated with a data block storing the new data (e.g., in the mapping information or MD structure such as of FIGS. 3, 4, 5 and 6), and 2) performing a decref of a reference counter (e.g., such as described in connection with FIG. 6) associated with the existing data stored in another data block. For MD consistency, the foregoing MD updates, along with possibly others, need to be performed atomically so that all such MD updates are performed or none of the MD updates are performed. In at least one embodiment in accordance with the techniques of the present disclosure, such transactional atomicity can be maintained across the multiple in-memory MD logs of each node where different MD updates of the same transaction can be stored in different ones of the in-memory MD logs of each single node. In at least one embodiment in accordance with the techniques of the present disclosure, such transactional atomicity can be maintained across the multiple RDLs or persisted MD logs where MD updates of the same transaction can be stored in both RDLs in accordance with the particular MD update types associated with each of the RDLs.

The techniques of the present disclosure also include performing processing which provides efficient recovery in response to node failover and other events.

The foregoing and other aspects of the techniques of the present disclosure are described in more detail in the following paragraphs.

In discussion in the following paragraphs, examples are provided for illustration in which the techniques of the present disclosure can be used with two RDLs and each node can have two in-memory MD logs, where a first of the RDLs and a first of the in-memory MD logs can be associated with a first set of one or more MD update types and a second of the RDLs and a second of the in-memory MD logs can be associated with a second set of one or more MD update types. More generally, the techniques of the present disclosure can be used in connection with more than two RDLs, more than 2 in-memory MD logs per node, and more than two sets of MD update types.

For a transaction or client transaction, sometimes denoted Tx, MD updates can generally be persisted to both RDLs, RDL1 and RDL2, or either a single one of the two RDLs. In some instances and contexts herein, the term "single" can refer to a transaction with a transaction record of one or more MD updates in only one of the RDLs and only one of the in-memory MD logs per node. The term "pair" can characterize a transaction with transaction records of MD updates in both RDLs and both in-memory MD logs per node.

The term "torn pair" can characterize a pair transaction where writing MD updates to only one transaction record of one of the two RDLs was completed but writing MD updates to the other RDL was not completed such as due to a failure or other event. With a torn pair, the failure or other event resulted in persistently storing MD updates in only a first of the two RDLs even though the single transaction also has other MD updates of MD update types associated with the remaining RDL The term "disconnected pair" can refer to a pair where transaction records of MD updates are written to both RDLs, followed by one of the transaction records of one of the RDL being reclaimed as a result of destaging.

Generally, a single transaction can include updates to both MDL instances so updates to both RDLs can be performed atomically. In this manner for a single transaction in at least one embodiment, MD updates to both RDLs for the transaction should be complete and written, or none of the MD updates for the transaction should be persisted to either RDL.

Figure 9:
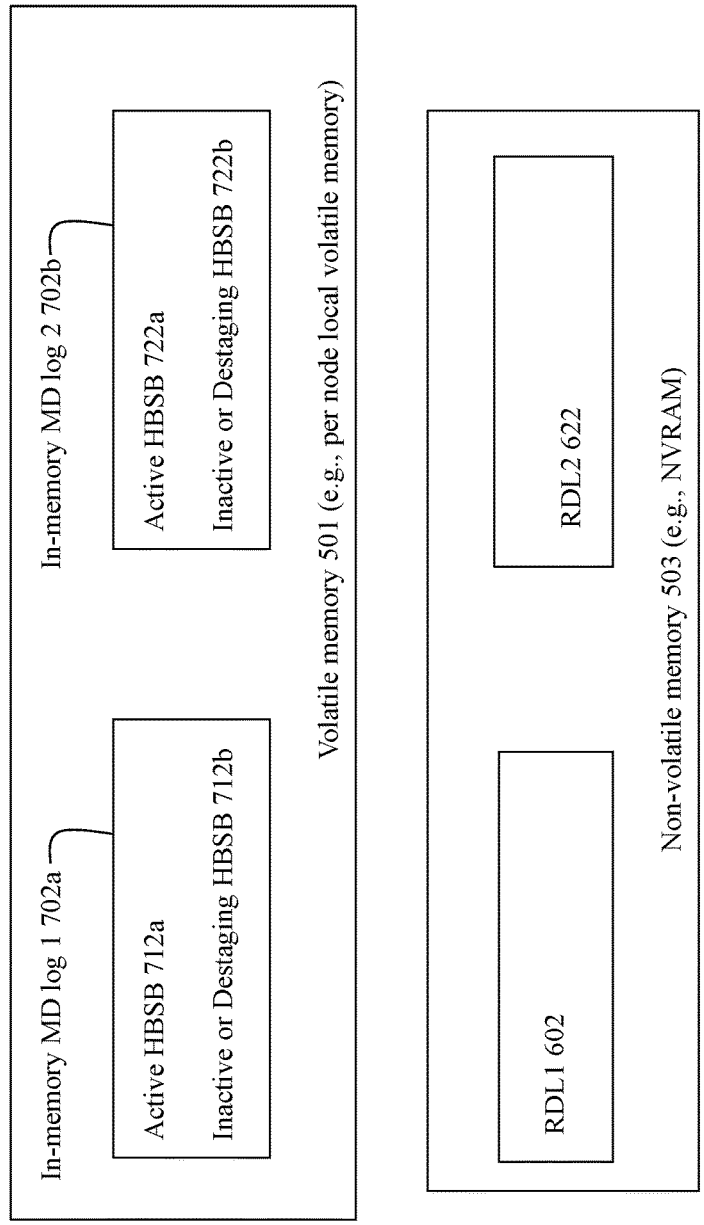
FIGS. 9 and 10 illustrate in-memory and persistent structures of a metadata log that can be used in at least one embodiment in accordance with the techniques of the present disclosure.

Referring to FIG. 9, shown is an example 700 illustrating the RDLs and the per node HBSBs in at least one embodiment in accordance with the techniques of the present disclosure.

The example 700 includes per node in-memory MD logs 702*a*-*b* and RDLs 602, 622. Consistent with other discussion herein, the in-memory MD logs 702*a*-*b* can be stored per node in volatile memory 501 which is local to the node. Thus each node can include its own local set of in-memory MD logs 702*a*-*b* in a manner similar to that as described in connection with FIG. 7 with the difference that each such node in connection with the example 700 of FIG. 9 rather includes two different in-memory MD logs 702*a*-*b* rather than one in-memory MD log. The RDLs 602 and 622 can be stored on non-volatile memory 503 such as NVRAM as described in connection with FIG. 7 where both nodes can access both RDLs 602 and 622. Rather than have a single persistent MD log such as 510 of FIG. 7, the embodiment of FIG. 9 includes two such persistent MD logs denoted as RDLs 602, 622.

In the example 700, the in-memory MD log 702*a* can include MD updates for a first set of one or more MD update types, and the in-memory MD log 702b can include MD updates for a second set of one or more MD updates. The RDL 602 can be used to persistently store MD updates of the first set of one or more MD update types. Thus, each entry stored in 702a can also be persistently stored in the RDL 602. The RDL 622 can be used to persistently store MD updates of the second set of one or more MD update types. Thus each entry stored in 702b can also be persistently stored in the RDL 622. In at least one embodiment, the first set and the second set of MD update types can be non-overlapping such that the intersection of the first set of MD update types and the second set of MD update types is null.

In at least one embodiment as described in connection with FIG. 7, each in-memory MD log 702a-b can include an active HBSB and an inactive or destaging HBSB. In particular, the in-memory MD log 702a can include HBSBs 712a-b which can correspond to 2 bucket sets or sets of data containers. The in-memory MD log 702b can include HBSBs 722a-b which can correspond to 2 bucket sets or sets of data containers. It should be noted that more generally, each of the active and inactive instances of an HBSB can also be any suitable structure which can be optimized for use with the particular one or more MD types stored therein.

Consistent with other discussion herein with respect to a single instance of an in-memory MD log 702a or 702b, when one or more of the buckets or containers of an active HBSB is full, the designation or role of active for that HBSB can be switched to destaging. MD updates from the inactive or destaging HBSBs can be destaged and applied to cached and/or persistent copies of corresponding MD pages. Once the inactive or destaging HBSB has completed destaging, the designation of destaging for the HBSB can be switched from destaging to active.

In at least one embodiment, different HBSBs of different in-memory MD logs across both nodes can be destaged independently of one another. Thus, in-memory MD logs 702a-b on the same node can be destaged independently one another and at different rates.

Figure 10:
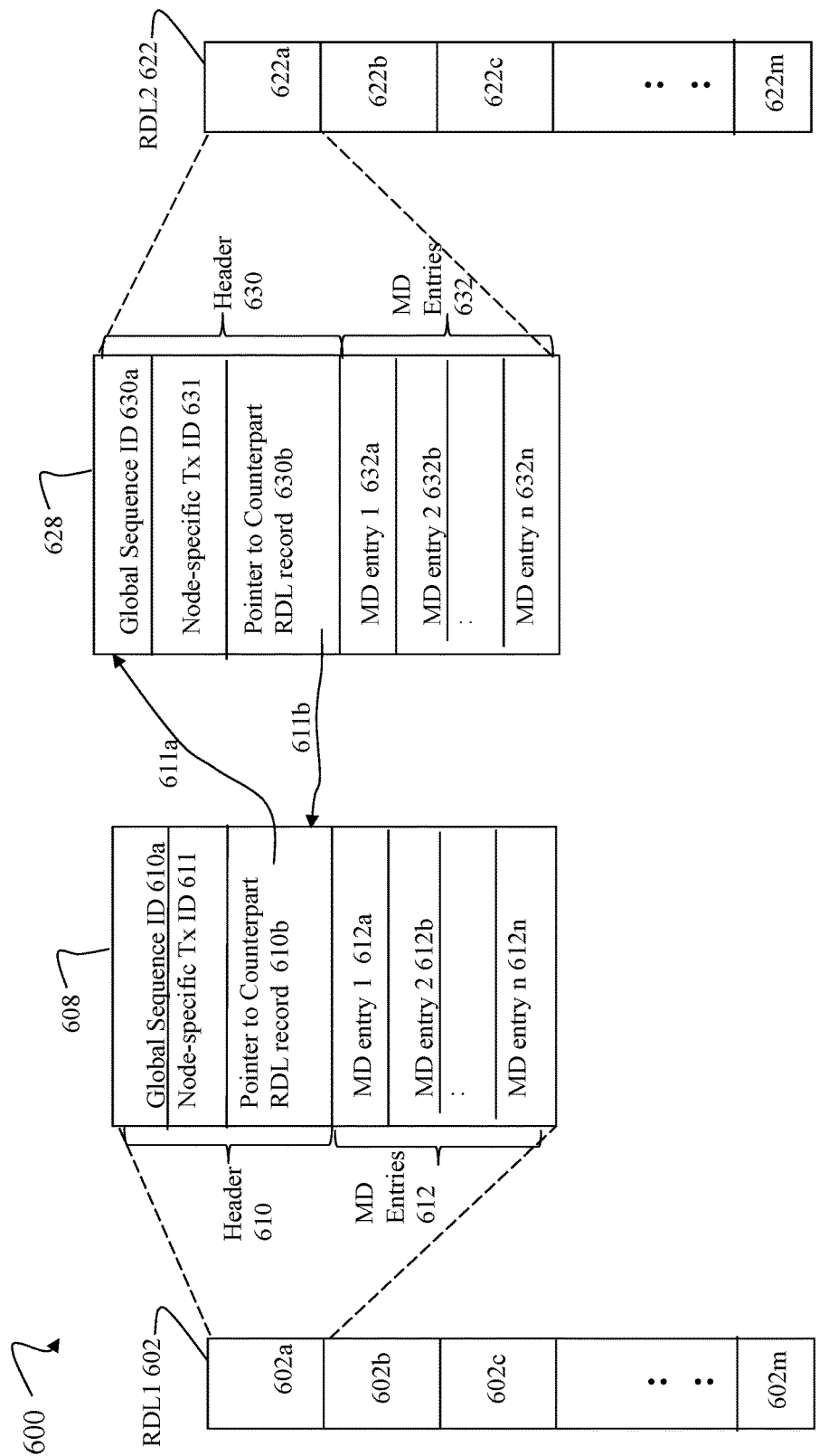

Referring to FIG. 10, shown is an example 600 of RDL structures used in at least one embodiment in accordance with the techniques of the present disclosure.

Generally, the example 600 illustrates details regarding two corresponding transactional RDL records for the same transaction as stored in the two RDLs 602, 604.

The RDL 1 602 can include transactions of MD updates for the first set of one or more MD update types, and RDL 2 622 can include transactions of MD updates for the second set of one or more MD update types. Each of the records 602a-m in the RDL 602 includes information for a different transaction of one or more MD updates. The element 608 provides additional detail regarding information that may be included in the record 602a. In a similar manner, each of the remaining records 602b-n can also include information similar to that of the record 602a as denoted by 608. The element 608 indicates that the record 602a of RDL 602 can include a header 610 and MD entries 612. The header 610 can include a global sequence identifier (ID) 610a which is unique for each transaction. Thus, the global sequence ID uniquely identifies the transaction, as represented by the record 602a and its counterpart record 622a, with respect to all other transactions. The header 610 can include field 610b which is a pointer, reference to, or address of a counterpart RDL record 622a in the RDL 622 for the same transaction as the record 602a. In this example, the record 622a can be characterized as the counterpart record for 602a, and the record 602a can be characterized as the counterpart record for 622a. Thus, the records 602 and 622a have the same global sequence ID value in the fields 610a and 630a. The header 610 can also include a node-specific Tx ID (identifier) 611 which is generally another type of transactional identifier that also uniquely identifies a transaction. However, the node-specific Tx ID is initiator managed and generated per node when the node operates as the initiator of a transaction of one or more MD updates. The node-specific Tx ID 611 is discussed in more detail elsewhere herein. The MD entries 612 generally includes one or more entries 612a-n for one or more corresponding MD updates included in the same single transaction associated with the record 602a. In at least embodiment, each of the MD entries 612a-n can be a tuple as described elsewhere herein which includes a MD update type of the first set.

Each of the records 622a-m in the RDL 622 includes information for a different transaction of one or more MD updates. The element 628 provides additional detail regarding information that may be included in the record 622a. In a similar manner, each of the remaining records 622b-n can also include information similar to that of the record 622a as denoted by 628. The element 628 indicates that the record 622a of RDL 622 can include a header 630 and MD entries 632. The header 630 can include a global sequence identifier (ID) 630a which is unique for each transaction. Thus, the global sequence ID uniquely identifies the transaction, as represented by the record 622a and its counterpart record 602a, with respect to all other transactions. The header 630 can include field 630b which is a pointer, reference to, or address of a counterpart RDL record 602a in the RDL 602 for the same transaction as the record 622a. In this example, the record 622a can be characterized as the counterpart record for 602a, and the record 602a can be characterized as the counterpart record for 622a. Thus, the records 602 and 622a have the same global sequence ID value in the fields 610a and 630a. The header 630 can also include a node-specific Tx ID (identifier) 631 which is generally another type of transactional identifier that also uniquely identifies a transaction. However, the node-specific Tx ID is initiator managed and generated per node from a node-specific sequence. The node-specific Tx ID 631 is discussed in more detail elsewhere herein. The MD entries 622 generally includes one or more entries for one or more MD updates included in the same single transaction associated with the record 622a. In at least embodiment, each of the MD entries 622a-n can be a tuple as described elsewhere herein which includes a MD update type of the second set.

In the example 600, the records 602a and 622a include MD updates which are in the same single transaction. In this case, the records 602a and 622a point to, or reference one another, as illustrated by the arrow 611a pointing from the record 602a (i.e., pointing from field 610b of the record 602a of RDL1 602) to the record 622a; and the arrow 611b pointing from the record 622a (i.e., pointing from field 630b of the record 622a of RDL2 622) to the record 602a. Also in this case, the records 602a and 622a include the same value for the global sequence ID in the fields 610a and 630a identifying the records 602a, 622a as including MD updates to the same transaction.

In at least one embodiment, a transaction can have an associated record in only one of the RDLs 602, 622 but not the other. In this case, it means that the transaction only has MD updates of one or more MD types associated with only a single one of the RDLs 602 or 622 but not both of the RDLs 602 and 622. For example, a transaction can have a single record such as 602c in RDL 602 but not have a counterpart record in RDL 622. In this case, the record 602c does not point to or reference any counterpart record in the RDL 622 whereby the value of the field 610*b* of the record 602*c* is null. In a similar manner, a transaction can have a single record such as 622*b* in RDL 622 but not have a counterpart record in RDL 602. In this case, the record 622*b* does not point to or reference any counterpart record in the RDL 602 whereby the value of the field 630*b* of the record 622*b* is null.

In at least one embodiment, for a pair of records R1, R2, wherein R1 is from RDL1 602 and R2 is from RDL2, R1 and R2 can be identified as included in the same transaction if both R1 and R2 have the same global sequence ID, if both R1 and R2 have the same node-specific Tx ID, if R1 points to or references R2, and if R2 references or points to R1 (whereby R1 and R2 are counterpart records in different RDLs.

In at least one embodiment, the global sequence ID assigned to each transaction uniquely identifies the transaction with respect to all transactions across both nodes in a dual node system, or more generally across all nodes in a multi-node system. Each global sequence ID can be assigned a next number in a monotonically increasing sequence of numbers. Generally, the global sequence ID can be incremented whenever space or storage (e.g., for one or more transaction records) is allocated for a transaction from one or more RDLs. In this manner, when records of an RDL are stored by logical offset or location within the RDL, the records are also similarly sorted by global sequence IDs corresponding to a time order in which the transaction records of MD updates are persisted to the RDL (e.g., increasing offsets and increasing global sequence IDs represents that the RDL records which higher sequence IDs are written after or later than other RDL records with lower sequence IDs and lower offsets).

In at least one embodiment, a designated one of the nodes can be a primary node which handles assigning or allocating global sequence IDs to transactions. Additionally in at least one embodiment, the primary node can handle allocating space or records from the RDLs 602 and 622 as needed for each transaction. Thus, if a single transaction includes MD updates with MD update types from both the first set and the second set of MD update types, the primary node can allocate for the single transaction a record from RDL 602 and a counterpart record from RDL 622. If a single transaction includes MD updates with MD update types of only the first set and not the second set of MD update types, the primary node can allocate for the single transaction a record from RDL 602 but not from RDL 622. If a single transaction includes MD updates with MD update types of only the second set and not the first set of MD update types, the primary node can allocate for the single transaction a record from RDL 622 but not from RDL 602. In at least one embodiment, if a first of the nodes is designated as the primary and fails, the other remaining peer node can assume the role and processing of the primary node.

In at least one embodiment, the node-specific Tx ID can be assigned to each transaction by the initiator node receiving and initiating the transaction. Each node can independently manage and generate node-specific Tx IDs from its own node-specific Tx ID sequence, where each node-specific Tx ID sequence is monotonically increasing. Additionally, the intersection of the node-specific Tx ID sequences of both nodes is null or the empty set (e.g., no overlap between the sets of IDs generated by the sequences) such that examining the node-specific Tx ID can be used to identify the particular node which generated node-specific Tx ID (e.g., identify the node, which acting as initiator for the transaction, assigned the node-specific Tx ID). For example, in at least one embodiment, node A can manage and allocate its node-specific Tx IDs from a first sequence of integers such as positive even numbers, and node B can manage and allocate its node-specific Tx IDs from a second sequence of integers such as positive odd numbers. In this manner, each time one of the nodes A or B is an initiator of a transaction, the initiator node can allocate a next number for the transaction based on the initiator's node-specific Tx ID sequence. The node-specific Tx ID and the global sequence ID both uniquely identify a transaction. Additionally, transactional records or records of RDLs 602 and 622 with the same node-specific Tx ID also belong to the same transaction of MD updates. In at least one embodiment as discussed elsewhere herein, the node-specific Tx ID can be used to identify duplicate RDL records within the same single RDL where one of the duplicates within the single RDL can be discarded or ignored.

In at least one embodiment for a single transaction, the primary node can: allocate storage or space for a transactions record of the RDL 602 and/or a transaction record of RDL 622; and assign the single transaction a global sequence ID which can be stored in the one or more allocated transaction records of RDLs 602 and 622 for the transaction. Additionally, if the primary node allocates a pair of records R1 and R1 for storing MD updates for the transaction (e.g., the transaction is a pair) with R1 allocated in RDL 602 and R2 allocated in RDL 622, processing can be performed so that each record of the pair points to its corresponding counterpart record of the pair. In at least one embodiment in particular, a field of R1 (e.g., field 610*b*) can be modified to point to or reference R2, and a field of R2 (e.g., field 630*b*) can be modified to point to or reference R1.

In at least one embodiment, processing for storing the global sequence ID and node-specific Tx ID in the transaction record(s), and, if needed, modifying R1 and R2 to point to each other can be performed by the peer node when persisting the MD updates and other information to R1 of RDL1 602 and R2 of RDL2.

What will now be described is processing that can be performed in connection with two nodes of the dual node appliance to synchronize access to one or more MD pages involved in a transaction. Thus, in this context and example described in the following paragraphs, updates to all of the one or more MD pages can be required for the transaction initiated by an initiator. The metadata updates to the one or more MD pages can be performed, for example, in connection with processing a write I/O received by the initiator node which is initiating the transaction of metadata updated applied to the one or more MD pages.

Figure 11A:
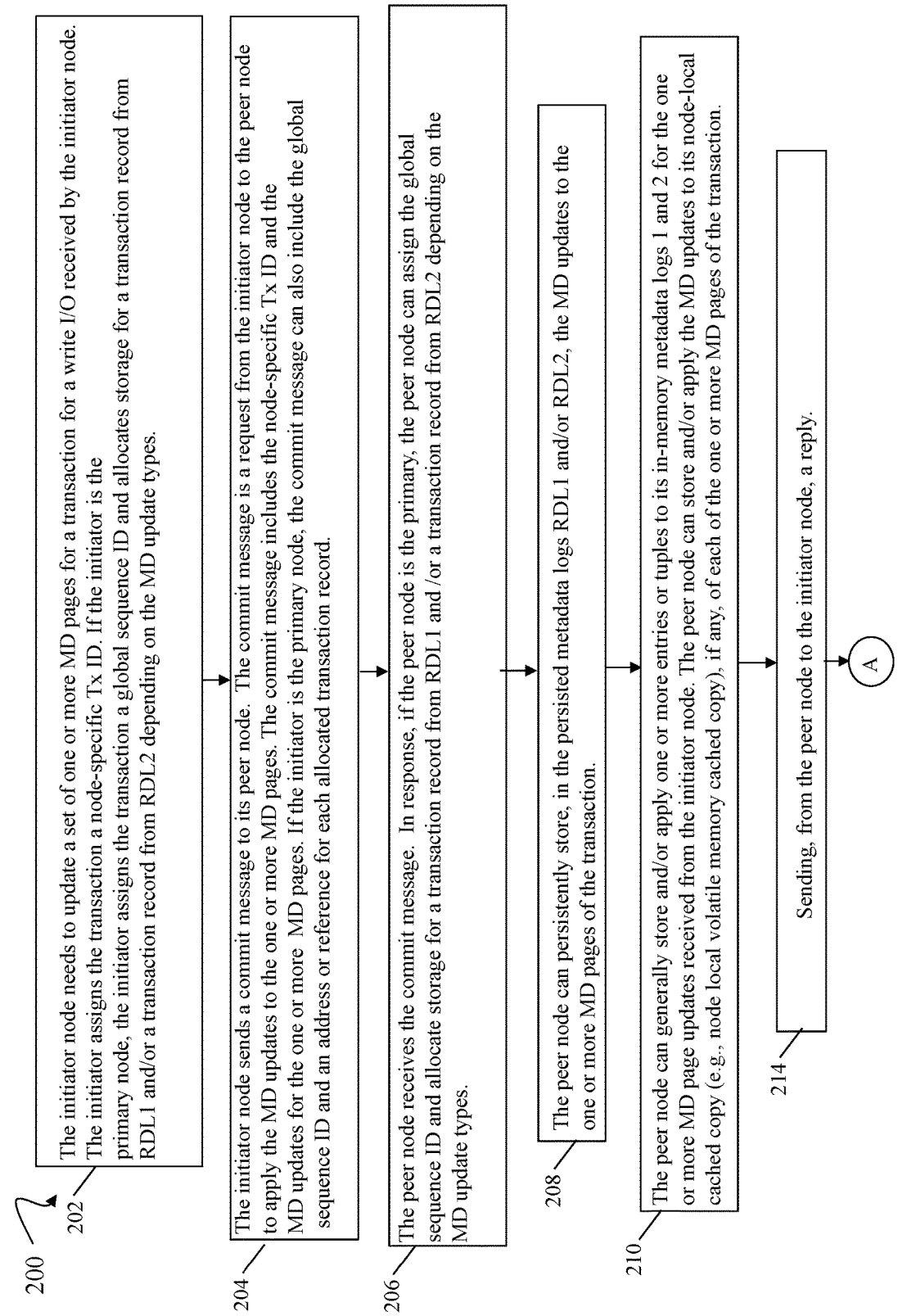
FIGS. 11A, 11B, 13A and 13B are flowcharts of processing steps that can be performed in at least one embodiment in accordance with the techniques of the present disclosure.
Figure 11B:
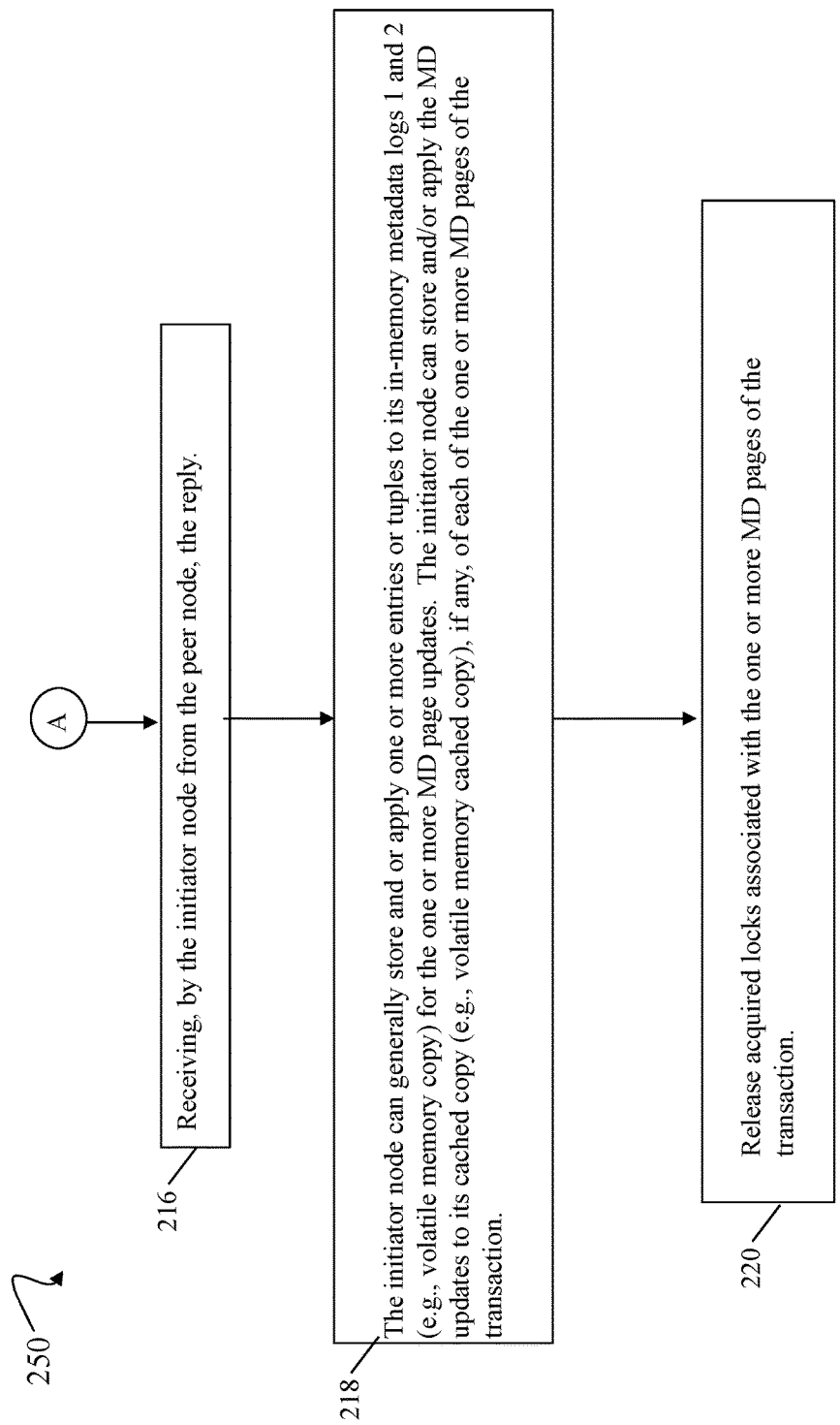

The flowchart of FIGS. 11A and 11B generally describes processing in which an initiator node (sometimes referred to simply as initiator) needs to perform updates on a set of one or more MD pages. Generally, a synchronization mechanism such as locks on the MD pages to be updated can be utilized in connection with applying the MD updates on the set of one or more MD pages. More generally, any suitable mechanism can be used to synchronize access to the set of one or more MD pages. In at least one embodiment, locks can be used where the locking granularity can be per MD page. In at least one embodiment, a form of local locks can be used. Specifically, the initiator node and its peer node (sometimes referred to simply as a peer) can each have their own local locks for MD pages accessible to both nodes. A request by an initiator node for the local lock for a MD page on the initiator node is a request for exclusive access to the MD page that is node local (e.g., within the scope of the initiator node). A request by an initiator node for the local lock for a MD page on its peer node is a request for exclusive access to the MD page that is node local (e.g., within the scope of the node). Thus local locks of one node can be acquired separately with no dedicated internode lock synchronization between nodes. For each MD page, the initiator node can have a first corresponding local lock and the peer node may have a second corresponding local lock. An initiator node that needs to apply an update to a particular MD page and requires exclusive access to the particular MD page must acquire the first local lock of the initiator node for the particular MD page and also acquire the second local lock of the peer node for the particular MD page prior to applying the update. Once the initiator node has acquired the local lock of the initiator node for the MD page and the local lock of the peer node for the MD page, the initiator node has exclusive access to the MD page and the update can be applied to the MD page. Once the update to the MD page has been applied, the local locks of the initiator node and the peer node previously acquired for the MD page can be released.

The local lock for a MD page can be characterized as local with respect to a single node for the MD page and can be used to provide lock semantics and serialization of access in the scope of only the single node. Thus, in order for a node in a dual node appliance to acquire exclusive access to a MD page, the node needs to acquire a first local lock for the MD page from a first of the two nodes and also acquire a second local lock for the MD page from the remaining node (e.g., a second of the two nodes).

In at least one embodiment, a separate lock procedure can be performed prior to performing the processing flow steps of FIGS. 11A and 11B and where the lock procedure can acquire any needed locks of the MD pages updated by the processing flow of FIGS. 11A and 11B.

Referring to FIGS. 11A and 11B, shown is a flowchart of processing steps that can be performed in an embodiment in accordance with the techniques herein. Consistent with other discussion herein, the FIGS. 9A and 9B describe processing that can be performed in connection with a transaction commit processing flow or protocol between an initiator node and its peer node when the initiator node performs processing to service a transaction and apply updates to one or more MD pages of the transaction.

At the step 202, the initiator node needs to update a set of one or more MD pages for a transaction such as, for example, for a write I/O received by the initiator node. The write I/O can write user data or write data to a target logical address expressed as a LUN and LBA. In this case, to service the write I/O operation, the initiator node performs metadata updates to set of one or more MD pages used to map the target logical address to a physical location where the new user data or write data is stored. In at least one embodiment such metadata updates to the MD pages used to access the physical storage location mapped to the target logical address where the new write data is written can be performed when destaging the write data or user data to the BE PDs providing the non-volatile storage for the write data or user data.

The set of one or more MD pages can be included in the MD pages of the MD mapping information or structure (e.g., such as described in connection with FIGS. 3, 4, 5 and 6). In the step 202, the initiator node assigns the transaction a node-specific Tx ID. If the initiator is also the primary node, the initiator assigns the transaction a global sequence ID and allocates storage for a transaction record from RDL1 602 and/or a transaction record from RDL2 622 depending on the MD update types. From the step 202, control proceeds to the step 204.

At the step 204, the initiator node sends a commit message to its peer node. The commit message is a request from the initiator node to the peer node to apply the MD updates to the one or more MD pages. The commit message in this protocol can also include, as a commit message payload, the node-specific Tx ID and the MD updates (e.g., updated metadata or content) for the one or more MD pages. If the initiator is the primary node, the commit message can also include the global sequence ID and an address or reference for each allocated transaction record. From the step 204, control proceeds to the step 206.

At the step 206, the peer node receives the commit message. In response, if the peer node is the primary, the peer node can assign the global sequence ID and allocate storage for a transaction record from RDL1 602 and/or a transaction record from RDL2 622 depending on the MD update types. From the step 206, control proceeds to the step 208.

At the step 208, the peer node can persistently store, in the persisted metadata logs RDL1 602 and/or RDL2 622, the MD updates to the one or more MD pages of the transaction. In at least one embodiment, persistently storing information in an allocated transaction record of RDL 602 or 622 can also include persistently storing the node-specific Tx ID (as provided by the initiator) and the global sequence ID. Additionally, if a pair of records R1, R2 for the transaction are allocated with R1 in RDL 602 and R2 in RDL 622 since the transaction has MD updates stored to both RDLs 602 and 622, persistently storing information in RDLs 602 and 622 in the step 208 can also include updating R1 and R2 to reference or point to each other. The action of persistently storing the MD updates can be performed atomically. In at least one embodiment where MD updates are persisted to both RDLs 602 and 622, the peer node can store the MD updates in the transaction records of RDL1 602 and RDL2 622 in parallel. For example, the peer node can issue a first write to RDL1 602 to persistently store MD updates for MD types of the first set, and a second write to RDL2 622 to persistently store MD updates for MD types of the second set, where the first write and the second write are performed in parallel. In at least one embodiment, more generally, the first and second writes of the MD updates can be performed atomically. In at least one embodiment, the commit message payload can include the tuples or entries recorded for the MD updates, where the tuples or entries are created by the initiator node (e.g., step 204) and sent to the peer node (e.g., step 206). The peer node can store, in the persisted metadata logs RDL1 and/or RDL2, the MD updates to the one or more pages of the transaction by storing the tuples or entries of the commit message payload received from the initiator node. Based on the MD update type of each MD update, the MD update can be stored in a particular one of RDL1 and/or RDL2 in the allocated record for the transaction. In particular, for a MD update if its MD update type is included in the first set of MD update types, the MD update can be stored in the transaction record of RDL1 602. For a MD update if its MD update type is included in the second set of MD update types, the MD update can be stored in the transaction record of RDL2 622. From the step 208, control proceeds to the step 210.

At the step 210, the peer node can store one or more entries or tuples in its in-memory metadata logs1 and 2 (e.g., in the peer node's volatile memory) for the one or more MD page updates received from the initiator node. The particular in-memory metadata log into which each MD update is stored is in accordance with the type of MD update. If the type of MD update is included in the first set of MD update types, the MD update is recorded in the transaction record in the in-memory metadata log 1 702*a*. If the type of MD update is included in the second set of MD update types, the MD update is recorded in the transaction record in the in-memory metadata log 2 702*b*. The peer node can store in its in-memory metadata logs 702*a-b* (e.g., active bucket sets of 702*a-b* in the peer node's volatile memory) the MD updates to the one or more pages of the transaction by storing the tuples or entries of the commit message payload received from the initiator node (e.g., received in the step 206). In at least one embodiment, the in-memory metadata logs of the initiator node and the peer node can mirror each other in that the in-memory metadata logs of the initiator and peer nodes can represent the same MD updates. The peer node can store and apply the MD updates to its node-local cached copy (e.g., node local volatile memory cached copy), if any, of each of the one or more MD pages of the transaction. Consistent with other discussion herein, the MD page updates represented as tuples each can be stored in and/or applied to an associated custom bucket or an associated regular bucket depending, at least in part, on the type T associated with each tuple. From the step 210, control proceeds to the step 214.

At the step 214, a reply message can be sent from the peer node to the initiator node indicating completion of the commit processing by the peer node. In at least one embodiment, the reply from the peer to the initiator can include the global sequence ID and the node-specific Tx ID for the transaction. From the step 214, control proceeds to the step 216.

At the step 216, the initiator node receives the reply from the peer node. From the step 216, control proceeds to the step 218.

At the step 218, the initiator node can store one or more entries or tuples in its in-memory metadata logs 1 and 2 (e.g., volatile memory copy) for the one or more MD page updates received from the initiator node. The particular in-memory metadata log into which each MD update is stored is in accordance with the type of MD update. If the type of MD update is included in the first set of MD update types, the MD update is recorded in the transaction record in the in-memory metadata log 1 702*a*. If the type of MD update is included in the second set of MD update types, the MD update is recorded in the transaction record in the in-memory metadata log 2 702*b*. The initiator node can store in its in-memory metadata logs 702*a-b* (e.g., active bucket sets of 702*a-b* in the initiator node's volatile memory) the MD updates to the one or more pages of the transaction by storing the tuples or entries. The initiator node can store and apply the MD updates to its cached copy (e.g., volatile memory cached copy), if any, of each of the one or more MD pages of the transaction. Consistent with other discussion herein, the MD page updates represented as tuples each can be stored in and/or applied to an associated custom bucket or an associated regular bucket depending, at least in part, on the type T associated with each tuple. In at least one embodiment, if the initiator node is also the secondary or non-primary node, the initiator can manage and update its own local copy of the current value of the global sequence ID. The foregoing local copy can be used in the case of failover, for example, if the peer node which is the primary fails and the current initiator (which is the secondary) then assumes the role of primary and must subsequently generate subsequent global sequence IDs. From the step 218, control proceeds to the step 220.

At the step 220, any/all locks acquired by the lock procedure for the one or more MD pages of the transaction can be released.

In connection with a local lock in at least one embodiment, if the requested local lock for a MD page is not available and is currently held by a node in connection with another transaction, processing for the request by the initiator can be blocked and wait in a queue associated with the local lock. In at least one embodiment, if there are multiple requests for multiple transactions blocked and waiting for the local lock, the multiple requests can be placed in the queue in a FIFO (first in first out) order in accordance with the time order in which the multiple requests attempted to acquire the local lock. In response to releasing the local lock of the FIFO queue, a next waiting request, if any, from the queue can proceed to attempt to acquire the local lock of the peer node for the transaction associated with the next waiting request. For example, such a queue as just described can be used in connection each local lock of an initiator node when attempting to acquire its own one or more local locks for one or more MD pages of the transaction. Additionally, such a queue as just described can be used in connection each local lock of a peer node when attempting to acquire, on behalf of the commit request from the initiator node for a transaction, one or more local locks of the peer node for the one or more MD pages of the initiator's transaction.

In connection with the foregoing description in FIGS. 11A and 11B, the initiator node receiving the write I/O operation can initiate updating the set of MD pages associated with accessing data stored on a particular LUN and can record (e.g., in the step 218) all the metadata updates to the set of MD pages in entries of its in-memory metadata logs 702*a-b*. In connection with the foregoing description in FIGS. 11A and 11B, the peer node (e.g., which does not receive the write I/O operation or more generally does not initiate the updating of the set of MD pages associated with accessing data stored on a particular LUN) can record (e.g., in the step 210) all the metadata updates to the set of MD pages in entries of its in-memory metadata logs 702*a-b* and also persistently in RDL1 and RDL2.

What will now be described is an example of node failover and identifying duplicate RDL records within a single RDL. Subsequently, discussion will consider identifying duplicate RDL records in connection with two RDLs where such duplicates can be created as a result of node failover when the failing node of a dual node system is a primary non-initiator node of the transaction.

Consider an example where the secondary or non-primary node is the initiator and the steps of the protocol as described in connection with the FIGS. 11A and B are performed. For illustration, assume that node A's node-specific Tx ID sequence is positive even numbers (e.g., 2, 4, 6, 8, etc.) and that node B's node-specific Tx ID sequence is positive odd numbers (e.g., 1, 3, 5, 7, etc). Also assume that the sequence of numbers of the global sequence ID is positive integers 1, 2, 3, 4, etc. Let node A be the initiator node that is also the non-primary or secondary node, and let node B be the peer or non-initiator node that is also the primary node. Relevant general processing flow can include the following steps:

S1. The secondary initiator node A allocates and assigns the transaction a node-specific transaction ID=2.

S2. The secondary initiator node A sends a commit message to the primary peer node B, where the message includes the node-specific transaction ID=2.

S3. The primary peer node B: allocates a global sequence ID=1; allocates storage for a transaction record R11 in an RDL; persistently stores information in the record R11 of the RDL where information includes the global sequence ID=1, the node-specific Tx ID=2, and the MD updates.

S4. The primary node B experiences a failure prior to returning a reply or acknowledgement to the secondary initiator node A.

S5. Failover from the node B as primary to node A occurs. In this case the failover from the failing primary node B to the node A results in the node A assuming the role of primary whereby node A is now both primary and initiator with respect to the current transaction.

S6. Primary initiator node A resumes processing for the transaction. Node A does not know what processing, if any, node B completed before failing. As a result, node A can resume processing for the transaction and perform all processing as typically performed by the secondary node B. In this case, node A allocates a global sequence ID=3; allocates storage for a transaction record R12 in an RDL; persistently stores information in the record R12 of the RDL where information includes the global sequence ID=3, the node-specific Tx ID=2, and the MD updates.

As a result of performing the steps S1-S6 above in sequential order, there are two records R11 and R12 for the same transaction which appear in the RDL. In at least one embodiment, R11 and R12 can be identified as duplicates based on the two records having the same node-specific Tx ID=2. In this case, one of the records R11 or R12 can be discarded since they both contain the same set of MD updates. In at least one embodiment, it should be noted that the global sequence ID of R11 and R12 may be different or the same depending on what node A has maintained locally as its current value for the global sequence ID.

In a similar manner as discussed above with a failing primary non-initiator node B with a single RDL, the failing primary non-initiator peer node B can also persistently store transaction records to both RDL1 602 and RDL2 622 (e.g., in the step S3) prior to failing and prior to returning the acknowledgement to the initiator node A (e.g., in the step S4). Thus, there can be duplicate records in both RDL1 602 and RDL2 622. In particular, for a valid pair J1=Rx, Ry, there can be a duplicate of Rx in RDL 602 and a duplicate of Ry in RDL 622, where Rx and its duplicate Rx" are in RDL 602, and where Ry and its duplicate Ry" are in RDL 622 (thus the valid pair J2=Rx", Ry" is a duplicate of the valid pair J1). In this case, there are two valid pairs J1, J2 which are duplicate valid pairs and processing can be performed in connection with different processing workflows described herein to utilize only a first of the duplicate valid pairs J1, J2 from the RDLs 602, 622 and may also discard and invalidate the other remaining one of the duplicate valid pairs J1, J2 from the RDLs 602, 622. In at least one embodiment, each of the records Rx, Ry, Rx", and Ry" in the foregoing have the same node-specific ID as assigned by the initiator node, Rx and Ry have the same global sequence ID=ID1, and Rx" and Ry" have the same global sequence ID=ID2, but where ID1 and ID2 can be different or the same.

Referring to FIGS. 12A-E, shown are examples 800 illustrating general operation of a single RDL in at least one embodiment in accordance with the techniques of the present disclosure, where the RDL is a ring buffer, such as described in connection with FIG. 8, and where the ring buffer is implemented as an array or vector of entries. Consistent with other discussion herein, an embodiment in accordance with the techniques of the present disclosure can implement multiple RDLs where each such RDL is used for storing transaction records of a particular set of one or more MD update types. In at least one embodiment in accordance with the techniques of the present disclosure using multiple RDLs, each RDL can operate in accordance with the processing as discussed herein such as in connection with the FIGS. 12A-E.

The example 800 also illustrates a general relationship between global sequence IDs (GSIs) assigned or allocated to different transaction records of MD updates stored in the RDL as well as the behavior of the head and tail in connection with writing records to the RDL and also completing a destaging operation which results in reclaiming space of corresponding records from the RDL. Generally, the FIGS. 12A-C denote the resulting RDL structure and associated head and tail pointers after writing 3 sequential transaction records A1-A3 to the RDL, and the FIGS. 12D-E denote the resulting RDL structure and associated head and tail pointers after reclaiming RDL storage associated with destaged transaction records A2 and A1 in order. In at least one embodiment as discussed elsewhere herein, a destaging operation can be performed where MD updates are destaged from an active set of buckets or data containers (e.g., HBSB 712*a*, 722*a*) stored in a node's in-memory MD log (e.g., 702*a*, 702*b*) in the node's volatile memory (e.g., 501). Once a set of MD updates are destaged from an in-memory MD log, persistent storage of corresponding one or more transaction records of the destaged MD updates can be reclaimed from the RDL. Put another way, once a set of MD updates are destaged from the in-memory MD log, corresponding RDL records can be reclaimed for reuse for persistently storing new MD updates. In at least one embodiment implementing the RDLs as ring buffers, such space reclamation of an RDL record can occur at a point in time subsequent to when the corresponding in-memory MD update records are destaged and also in accordance with the tail pointer of the RDL as discussed below and elsewhere herein.

Figure 12A:
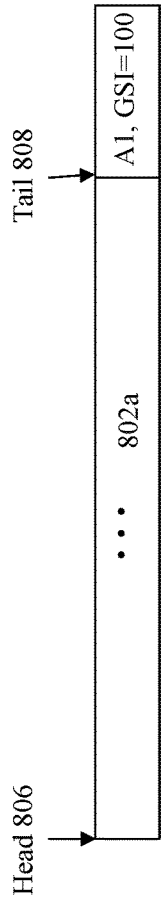
FIGS. 12A-E are examples illustrating various states of a persistent MD log implemented as a ring buffer in at least one embodiment in accordance with the techniques of the present disclosure.

FIG. 12A illustrates the RDL at a first point in time P1 with the record A1 having a GSI=100. Consistent with other discussion herein, the tail 808 points to the next record A1 to be flushed or destaged from the RDL, and the head 806 points to the next free record for use with a transaction to store MD updates for the transaction. At the time P1, the space 802*a* between the head 806 and the tail 808 denotes the reclaimed space or storage which is free or available for allocation in connection with new transaction records of the RDL.

Figure 12B:
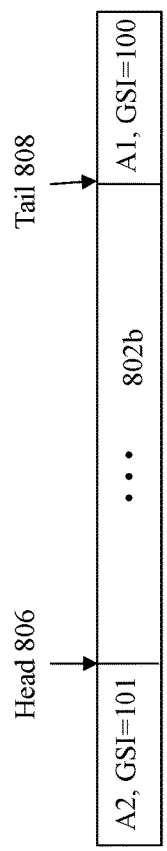

FIG. 12B illustrates the RDL at a second point in time P2 subsequent to P1, after writing the next transaction record A2 of MD updates to the RDL, where A2 has a GSI=101. Note that the head pointer 806 is advanced in the FIG. 12B to point to space or storage immediately following A2. At the time P2, the space 802*b* between the head 806 and the tail 808 denotes the reclaimed space or storage which is free or available for allocation in connection with new transaction records of the RDL.

Figure 12C:
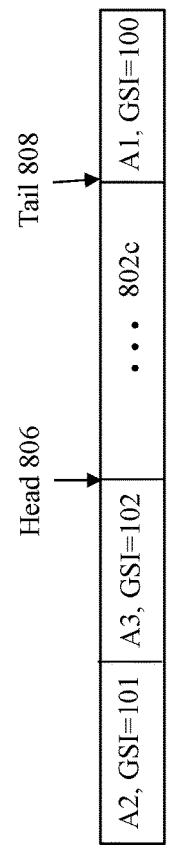

FIG. 12C illustrates the RDL at a third point in time P3 subsequent to P2, after writing the next transaction record A3 of MD updates to the RDL, where A3 has a GSI=102. Note that the head pointer 806 is again advanced in the FIG. 12C to point to space or storage immediately following A3. At the time P3, the space 802*c* between the head 806 and the tail 808 denotes the reclaimed space or storage which is free or available for allocation in connection with new transaction records of the RDL.

Figure 12D:
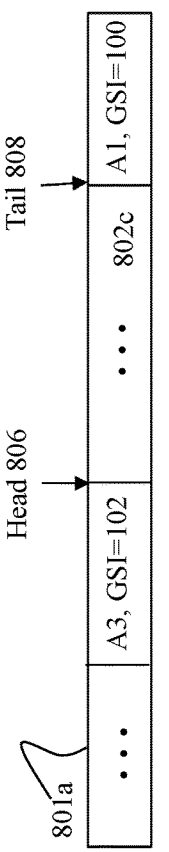

FIG. 12D illustrates the RDL at a fourth point in time P4 subsequent to P3, after completing a first destaging operation of MD updates as included in the record A2 from the RDL. In this case, the tail pointer 308 does not advance since the MD updates of A1 have not yet been destaged. At the time P4, the space 802c denotes the reclaimed space or storage which is free or available for allocation in connection with new transaction records of the RDL. The space 801a denotes space or storage which has not yet been reclaimed. RDL storage, such as region 801a, which has not yet been reclaimed is generally located after the tail 808 and prior to the head if the ring buffer is viewed as logically formed as described in connection with FIG. 8. In one aspect, the region 801a can be characterized as free but has not yet been reclaimed for reuse, where 801a is not yet available for allocation since it has not been reclaimed as it occurs logically after the tail 808 but prior to the head 806 in the ring buffer.

Figure 12E:
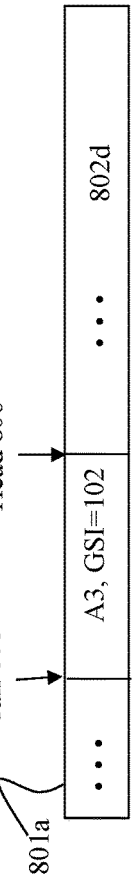

FIG. 12E illustrates the RDL at a fifth point in time P5 subsequent to P4, after completing a second destaging operation of MD updates as included in the record A1 from the RDL. In this case, the tail pointer 308 is advanced to point to A3 since the MD updates of A1 have now been destaged. At P5, the space 801a and the space 802d collectively denote reclaimed space or storage which is free or available for allocation in connection with new transaction records of the RDL.

Also note that generally the tail of the RDL can point to the lowest valid GSI of transaction records of the RDL which are persisted and include MD updates which have not yet been destaged. The tail of the RDL does not advance or move beyond a record of MD updates which are still persisted and not yet destaged. In one aspect, FIG. 12D can be characterized as including a hole 801a of RDL storage of RDL records of MD updates which have been destaged but where such storage of the RDL records (of the destaged MD updates) cannot yet be reclaimed for reuse due to the intervening record A1 of MD updates which are not yet destaged. The tail is only advanced across contiguous RDL records associated with destaged MD updates. In FIG. 12D, record A1 has not yet been destaged so the tail 808 cannot be advanced beyond A1 even though MD updates of A2 have been destaged.

In connection with at least one embodiment using 2 RDLs such as described in connection with FIG. 9 where the RDLs 602 and 622 are ring buffers implemented as described herein such as in connection with FIGS. 12A-E, processing can be performed such that neither tail of the RDLs 602, 622 moves beyond the 2 transaction records of a pair Tx (wherein one record R1 for the pair Tx is in RDL 1 602 and the second record R2 for the pair Tx is in RDL2 622) while the two records R1 and R2 are being persisted such as by a peer or non-initiator node. Thus, if the persisting operation (e.g., as can be performed by the peer or non-initiator node) of the MD updates in R1 and R2 for a pair Tx is interrupted, a torn pair can result such that the single record written to one of 602, 622 can have a higher GSI than either of the tails of RDLs 602 and 622, where the single record of the torn pair can be invalidated.

In at least one embodiment of a dual node data storage system, a stop-start event can generally be characterized as any event which causes both nodes of the system to stop and then reboot or restart. More generally, the stop-start event can cause all nodes of a multi-node system to reboot and restart. For example, a power outage or power failure is one example of a stop-start event in at least one embodiment. Upon rebooting or restarting, the system can initiate RDL recovery where the persistently stored RDL information of the RDLs 602 and 622 can be used to repopulate the in-memory MD logs 702a-b of each of the nodes (e.g., repopulate the HBSB 712b of 702a and the HBSB 722b of 702b as on each of the nodes).

When the system is rebooted, one of the nodes, such as node A can be the first node rebooted and restarted. In this case, the first rebooted node A can assume the role as the primary node and initiate and perform RDL recovery processing such as described herein, for example, in connection with FIGS. 13A and 13B. Generally, RDL recovery processing iterates over the records of both RDL1 602 and RDL 2 622, from tail to head. RDL recovery processing can first be performed which iterates or traverses over records of RDL1 602, and subsequently the processing can be repeated with the difference that such processing iterates or traverses over records of the remaining RDL2 622.

Generally, all valid pairs Rx and Ry are encountered twice since processing includes traversing both RDLs 602 and 622. Thus generally processing during the RDL2 622 traversal can include ensuring that a previously encountered valid Rx, Ry pair during the RDL1 602 traversal is not recovered or restored twice. Any suitable technique can be used to track valid Rx, Ry pairs encountered during RDL recovery processing to avoid recovering or restoring the same valid Rx, Ry pair multiple times. Additionally, in at least one embodiment as discussed elsewhere herein, duplicate records in the same RDL can occur as a result of node failover such as a primary node failing when the primary node is also the non-initiator or peer node of a transaction initiated by a secondary non-primary node. In a similar manner with a primary peer/non-initiator node failing, there can be duplicate records in both RDL1 602 and RDL2 622. In particular, for a valid pair Rx, Ry, there can be a duplicate of Rx in RDL 602 and a duplicate of Ry in RDL 622, where Rx and its duplicate Rx" are in RDL 602, and where Ry and its duplicate Ry" are in RDL 622. In this case, there are two valid pairs which are duplicate valid pairs and processing can be performed to recover and restore one of the duplicate valid pairs to the in-memory MD logs 702a-b, and discard and invalidate the other duplicate pair from the RDLs 602, 622.

Figure 13A:
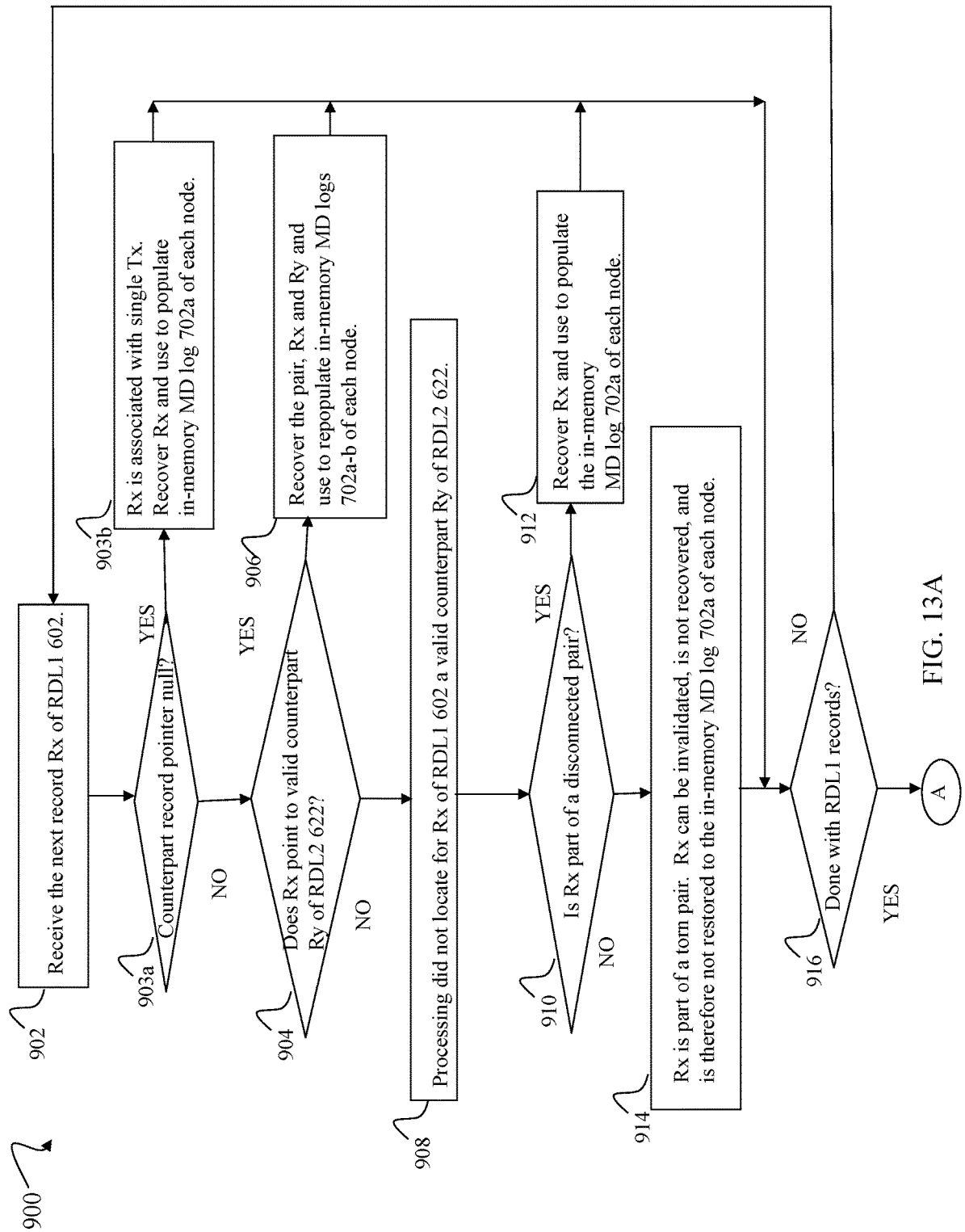
Figure 13B:
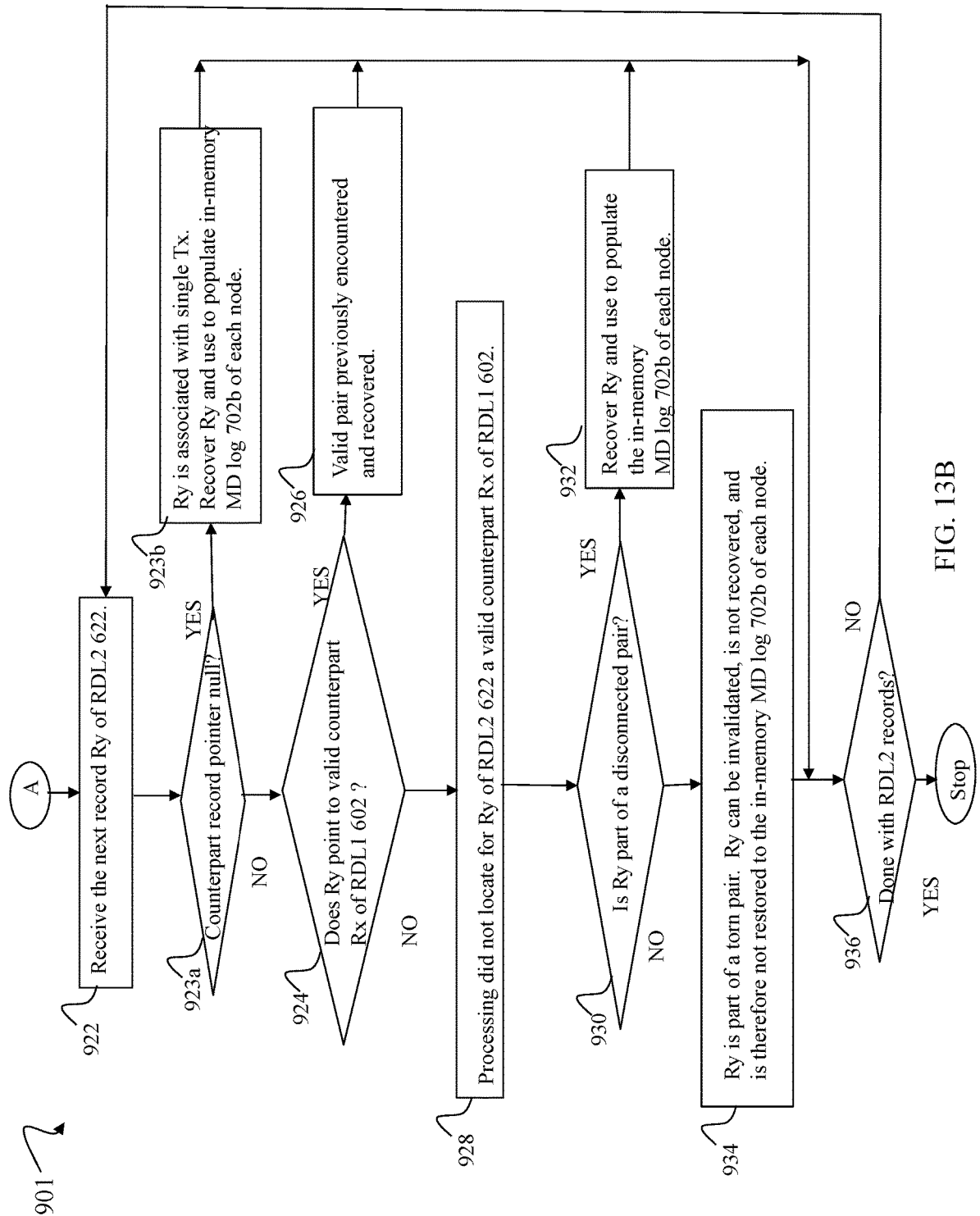

To further illustrate, reference is made to FIGS. 13A and 13B of a flowchart 900, 901 of RDL recovery processing steps that can be performed in at least one embodiment in accordance with the techniques of the present disclosure. Generally, processing can start with traversing RDL1 602 from tail to head and, for each transaction record of RDL1 602, attempt to locate a valid counterpart record referenced in RDL2 622.

At the step 902, the next record Rx of RDL1 602 to be processed is received. From the step 902, control proceeds to the step 903a to determine whether Rx's counterpart pointer is null. With reference to FIG. 10, the field 610b of Rx can be examined to determine whether it includes a pointer, address or reference to a counterpart Ry record in RDL 2 622, or whether the field 610b is null.

If the field 610b is null, the step 903a evaluates to yes, whereby then there is no counterpart record Ry in RDL2, Rx is associated with a single Tx, and control proceeds to the step 903b. In the step 903b, Rx can be recovered and used to repopulate the in-memory MD log 702a of each node. Generally, the step 903b performs processing to restore Rx from the RDL 1 602 to the in-memory MD log 702a of each of the nodes. It should be noted that recovery and restoration of Rx from RDL 602 to the in-memory MD log 702a in the step 903b can be conditionally performed if Rx is not a duplicate of another record Rj previously restored from the RDL 602 during a prior iteration of the processing loop of FIG. 13A. As discussed elsewhere herein such as may occur as a result of a node failover of a failed primary non-initiator node, two records Rx1 and Rx2 from the same single RDL instance, such as RDL1 602, can be determined as duplicates if both Rx1 and Rx2 have the same or matching node-specific Tx IDs. From the step 903b control proceeds to the step 916.

If the field 610b is non-null, the step 903a evaluates to no and control proceeds to the step 904 where processing can be performed to determine whether the field 610b references or points to a valid counterpart record Ry in RDL2. If 610b is non-null, the step 904 considers, as a first case, whether Rx points to a valid counterpart Ry of RDL2 622. The step 904 determines whether the field 610b of Rx of RDL1 602 references a valid counterpart Ry in RDL2. In at least one embodiment, if Rx and Ry have matching global sequence IDs and matching node-specific Tx IDs, then it can be determined that Rx and Ry are valid counterpart records.

In response to determining that Rx and Ry are valid counterparts of the same transaction, the step 904 evaluates to yes and control proceeds to the step 906 to recover the pair Rx and Ry. The step 906 can include performing processing which restores Rx from RDL1 602 to the in-memory MD log 702a of each of the nodes, and Ry can be restored from the RDL 2 622 to the in-memory MD log 702b of each of the nodes. It should be noted that the recovery and restoration of the valid pair K1=Rx, Ry can be performed conditionally upon determining that the valid pair K1 is not a duplicate of an already recovered and restored valid pair K2. In at least one embodiment, the valid pair K1=(Rx, Ry)(where Rx is a record in RDL 602 and Ry is a record in RDL 622) can be determined as a duplicate of a second valid pair K2=Ra, Rb, where Ra is a record included in RDL 602 and Rb is a record in RDL 622, if Rx, Ty, Ra and Rb all have the same node-specific transaction ID. From the step 906, control proceeds to the step 916.

If the step 904 evaluates to no and control proceeds to the step 908 where it is determined that processing did not locate, for Rx of RDL1 602, a valid counterpart Ry of RDL2 622. From the step 908, control proceeds to the step 910 where a determination is made as to whether Rx is part of a disconnected pair. In at least one embodiment, the step 910 can make such a determination of whether Rx is part of a disconnected pair by determining whether Rx is older than the record pointed to by RDL2 tail. If Rx is older than the record pointed by the RDL2 tail, then Rx is part of a disconnect pair, where the valid counterpart Ry of RDL2 622 has already been destaged. In at least one embodiment, the determination of whether Rx is older than another record Q pointed to by the RDL2 tail can be made by examining the first global sequence ID GSI1 of Rx and the second global sequence ID GSI2 of Q. If the GSI1 of Rx is less than GSI2 of the RDL2 tail, then the step 910 evaluates to yes where processing determines Rx is valid and is part of a disconnected pair. If the step 910 evaluates to yes, control proceeds to the step 912 where processing can be performed to recover and restore Rx of RDL1 602 to the in-memory MD log 902a of each node. It should be noted that recovery and restoration of Rx from RDL 602 to the in-memory MD log 702a in the step 912 can be conditionally performed if Rx is not a duplicate of another record Rj previously restored from the RDL 602 during a prior iteration of the processing loop of FIG. 13A. As discussed elsewhere herein such as may occur as a result of a node failover of a failing primary non-initiator node, two records Rx1 and Rx2 from the same single RDL instance, such as RDL1 602, can be determined as duplicates if both Rx1 and Rx2 have the same or matching node-specific Tx IDs. From the step 912, control proceeds to the step 916.

If the step 910 evaluates to no, Rx is newer than the record Q pointed to by the RDL2 tail (i.e., GSID1 of Rx>GSID2 of Q pointed to by the RDL2 tail), and control proceeds to the step 914 where processing determines that Rx is part of a torn pair. Consistent with other discussion elsewhere herein, a torn pair is where the Tx includes MD updates that should be recorded in both RDLs 602 and 622, but a failure occurs during the processing to persistently store records in both of the RDLs 602 and 622 so that only 1 record is stored in one of the RDLs 602 or 622 for the Tx. In this case, the step 914 determines that Rx is part of a torn pair so that Rx can be invalidated, is not recovered, and is therefore not restored to the in-memory MD log 702a of each node. From the step 914, control proceeds to the step 916.

At the step 916, processing determines whether all records of RDL1 602 have been traversed whereby processing is done for RDL1 602. If the step 916 evaluates to no, control proceeds to the step 902 to process the next record Rx of RDL1 602. If the step 916 evaluates to yes, control proceeds to the step 922 to commence processing and traversal of RDL2 622.

At the step 922, the next record Ry of RDL2 622 is received. From the step 922, control proceeds to the step 923a to determine whether the counterpart record pointer of Ry is null. The step 923a is similar to the step 903a with the difference that the record examined in 923a is Ry of RDL2 622. If the step 923a evaluates to yes, control proceeds to the step 923b where it is determined that Ry is associated with a single Tx. Processing of the step 923b recovers Ry from RDL 622 and restores it to the in-memory MD log 702b of each node. It should be noted that recovery and restoration of Ry from RDL 622 to the in-memory MD log 702b in the step 923b can be conditionally performed if Ry is not a duplicate of another record Rj previously restored from the RDL 622 during a prior iteration of the processing loop of FIG. 13B. As discussed elsewhere herein as may occur as a result of node failover of a failing primary non-initiator node, two records Rx1 and Rx2 from the same single RDL instance, such as RDL2 622, can be determined as duplicates if both Rx1 and Rx2 have the same or matching node-specific Tx IDs. From the step 923b, control proceeds to the step 936.

If the step 923a evaluates to no, control proceeds to the step 924 where it is determined whether Ry points to a valid counterpart Rx of RDL1 602. The step 924 is similar to the step 904. In at least one embodiment, Ry and Rx (as pointed to or referenced by Ry) can be determined as valid if both Rx and Ry have the same or matching global sequence IDs and also the same or matching node-specific Tx IDs. If the step 924 evaluates to yes, control proceeds to the step 926 where it can be determined that the valid pair was previously recovered and encountered during the traversal of RDL1 602. From the step 926, control proceeds to the step 936.

If the step 924 evaluates to no, control proceeds to the step 928 where it is determined that processing did not locate, for Ry, a valid counterpart Rx of RDL1 602. From the step 928, control proceeds to the step 930 where a determination is made as to whether Ry is part of a disconnect pair. The step 930 is similar to the step 910 with the difference that it is performed using Ry and the tail of RDL1 602 rather than Rx and the tail of RDL2 622. In at least one embodiment, the step 930 can make such a determination of whether Ry is part of a disconnected pair by determining whether Ry is older than the record pointed to by RDL1 602 tail. If Ry is older than the record pointed by the RDL1 tail, then Ry is part of a disconnect pair, where the valid counterpart Rx of RDL1 602 has already been destaged. In at least one embodiment, the determination of whether Ry is older than another record Z pointed to by the RDL1 tail can be made by examining the first global sequence ID GSI1 of Ry and the second global sequence ID GSI2 of Z. If the GSI1 of Ry is less than GSI2 of the RDL2 tail, then the step 930 evaluates to yes where processing determines Ry is valid and is part of a disconnected pair. If the step 930 evaluates to yes, control proceeds to the step 932 where processing can be performed to recover and restore Ry of RDL2 622 to the in-memory MD log 902b of each node. It should be noted that recovery and restoration of Ry from RDL 622 to the in-memory MD log 702b in the step 932 can be conditionally performed if Ry is not a duplicate of another record Rj previously restored from the RDL 622 during a prior iteration of the processing loop of FIG. 13B. As discussed elsewhere herein as may occur as a result of node failover where the failing node is the primary non-initiator, two records Rx1 and Rx2 from the same single RDL instance, such as RDL2 622, can be determined as duplicates if both Rx1 and Rx2 have the same or matching node-specific Tx IDs. From the step 932, control proceeds to the step 936.

If the step 930 evaluates to no, control proceeds to the step 934 which is similar to the step 914 except it is performed with respect to Ry rather than Rx. If the step 930 evaluates to no, Ry is newer than the record Z pointed to by the RDL1 tail (i.e., GSID1 of Ry>GSID2 of Z pointed to by the RDL1 tail), and control proceeds to the step 934 where processing determines that Ry is part of a torn pair. Consistent with other discussion elsewhere herein, a torn pair is where the Tx includes MD updates that should be recorded in both RDLs 602 and 622, but a failure occurs during the processing to persistently store records in both of the RDLs 602 and 622 so that only 1 record is stored in one of the RDLs 602 or 622 for the Tx. In this case, the step 934 determines that Ry is part of a torn pair so that Ry can be invalidated, is not recovered, and is therefore not restored to the in-memory MD log 702b of each node. From the step 934, control proceeds to the step 936

At the step 936, a determination is made as to whether all records of RDL2 have been processed. If the step 936 evaluates to yes, processing stops. Otherwise if the step 936 evaluates to no, control proceeds to the step 922 to process the next record Ry of the RDL2 622.

Node failback processing can be performed when a failed node is rebooted and restarts. For example, consider the case where node B as failed so that node A is the sole primary node running. Subsequently, the failed node B can be rebooted and restarted where the node B can now perform node failback processing. The node B assumes the role of secondary and can perform node failback processing which includes processing to recover and restore the in-memory MD log instances 702a-b in per node volatile memory 501 of the node B. In at least one embodiment, the node failback processing performed by the node B can include the processing as described in connection with FIGS. 13A and 13B with the difference that the secondary or non-primary node B may not perform any persistent updates to the RDLs 602 and 622, for example, such as to invalidate any records of the RDLs 602 and 622 in the case of duplicate transaction records and/or torn pairs. In at least one embodiment, the node B performing the failback processing can ignore detected duplicates and detected records of torn pairs but not perform any invalidations or updates to the RDLs 602 and 622. In this manner, any such invalidations or updates to the RDLs 602 and 622 can be deferred until the next stop-start event and associated processing as performed by the primary node.

The techniques of the present disclosure have been illustrated with two RDLs and two corresponding in-memory MD logs. More generally, the techniques of the present disclosure can be used in connection with N RDLs and N corresponding in-memory MD logs, where each RDL (storing MD updates with types included in a set of MD update types) has a corresponding in-memory MD log used to store MD updates with types included in the same set of MD update types. In at least one embodiment of the protocol or processing as described in connection with FIGS. 11A and 11B, the step 208 can more generally include the peer non-initiator node persistently storing records of MD updates in the N RDLs in parallel, or more generally any of the N RDLs in parallel as may be needed depending on the MD update types of the transaction. In at least one embodiment where the peer node performs the writes to persistent storage to the RDLs in parallel, each transaction record of an RDL may point to, or reference, all other transaction records of all other RDLs. To further illustrate, consider a case of 3 RDLs, RDL1, RDL2 and RDL3 where R1 of RDL1, R2 of RDL2 and R3 of RDL3 include MD updates for the same single transaction. In this case, R1 can point to R2 and R3; R2 can point to R1 and R3; and R3 can point to R1 and R2.

As a variation to the foregoing in at least one embodiment, rather than have the non-initiator peer node persistently store transaction records of the same transaction in parallel to the multiple RDLs such as in the step 208, the non-initiator peer node can store the transaction records serially such as in a predefined or predetermined order. For example, consider the noted above case of 3 RDLs, RDL1, RDL2 and RDL3 where R1 of RDL1, R2 of RDL2 and R3 of RDL3 include MD updates for the same single transaction. With the serialized approach, the non-initiator peer node may persistent the records of MD updates to the multiple RDLs in a predetermined order such as to write R1 to RDL1, R2 to RDL2 and then R3 to RDL3. In the event that no MD updates of a particular type are included in a transaction such that, for example, there are no MD updates to RDL2 but there are MD updates to RDL1 and RDL3, the persisting of the MD updates to the multiple RDLs can be performed in accordance with the predetermined order with omission of any RDL if there is no MD update to be persisted to that RDL. In this case, the MD updates are persisted sequentially to RDL1 and then RDL3. With the serialized approach, the transactions records of the multiple RDLs can form a linked list or chain. For example, record R1 of RDL1 can point to R2 of RDL2, and R2 can point to R3 of RDL3. In at least one embodiment, the linked list can be a singly linked list where each entry only points to the next entry (if any) in the list, or alternatively, the linked list can be a doubly linked list where each entry points to the next entry (if any) in the list and also points to the prior entry (if any) in the list.

In at least one embodiment using the serialized approach in which MD updates are persistently stored to the N RDLs in a predefined order and where each transaction includes MD updates written to all N RDLs, RDL recovery processing, such as described in connection with FIGS. 13A and 13B, can be optimized in that processing can be performed to only iterate over the first RDL written to in the predefined order.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
    receiving, at a first node of a system, a request, wherein the request is a transaction comprising a plurality of MD (metadata) updates including a first MD update of a first MD update type and including a second MD update of a second MD update type, wherein the first MD update type is included in a first set of MD update types, and wherein the second MD update type is included in a second set of MD update types;
    in response to receiving the request, performing processing including:
        storing, in a first volatile MD log, the first MD update;
        storing, in a second volatile MD log, the second MD update;
        storing, in a first non-volatile MD log, the first MD update; and
        storing, in a second non-volatile MD log, the second MD update, wherein each MD update stored in the first volatile MD log and the first non-volatile MD log has a first corresponding MD update type included in the first set, and wherein each MD update stored in the second volatile MD log and the second non-volatile MD log has a second corresponding MD update type included in the second set, wherein each MD update type of the first set is different from each MD update type in the second set; and
    performing first processing by the first node to recover MD updates from the first non-volatile MD log and the second non-volatile MD log, said first processing including:
        receiving a first transaction record from the first non-volatile MD log;
        responsive to determining the first transaction record has a valid corresponding transaction record in the second non-volatile MD log, determining whether the first transaction record and the valid corresponding transaction record denote a first pair which is a duplicate transaction of a second pair of transaction records, wherein the second pair of transaction records includes one transaction record from the first non-volatile MD log and another transaction record from the second non-volatile MD log; and
        responsive to determining the first pair is not a duplicate of the second pair, populating the first volatile MD log and the second volatile MD log of the first node in accordance with MD updates of the first pair, and otherwise discarding and invalidating the first pair.

2. The computer-implemented method of claim 1, wherein a set intersection of the first set of MD update types and the second set of MD update types is null such that each MD update type in the first set is not included in the second set and each MD update type in the second set is not included in the first set.

3. The computer-implemented method of claim 2, wherein each entry in the first volatile MD log has a corresponding entry in the first non-volatile MD log, and wherein each entry in the second volatile MD log has a corresponding entry in the second non-volatile MD log.

4. The computer-implemented method of claim 3, wherein the system includes the first node and a second node, wherein the first volatile MD log and the second volatile MD log are local to the first node and included in a first volatile memory of the first node.

5. The computer-implemented method of claim 4, wherein the second node performs said storing, in the first non-volatile MD log, the first MD update, and wherein the second node performs said storing, in the second non-volatile MD log, the second MD update.

6. The computer-implemented method of claim 5, wherein the second node includes a third volatile MD log and a fourth volatile MD log included in second volatile memory which is local to the second node, wherein the computer-implemented method includes:
    storing, by the second node, the first MD update in the third volatile MD log; and
    storing, by the second node, the second MD update in the fourth volatile MD log, wherein each MD update stored in the third volatile MD log has a corresponding MD update type included in the first set, and wherein each MD update stored in the fourth volatile MD log has a corresponding MD update type included in the second set.

7. The computer-implemented method of claim 6, wherein the first non-volatile MD log includes the first transaction record which comprises an entry for the first MD update, and wherein the second non-volatile MD log includes the second transaction record which comprises an entry for the second MD update, wherein the first transaction record and the second transaction record include a same global sequence identifier (ID) and include a same node-specific transaction ID.

8. The computer-implemented method of claim 7, wherein the first node is an initiator of the transaction corresponding to the request and the initiator of the transaction allocates and assigns the transaction a unique node-specific transaction ID from a node-specific transaction ID sequence, and wherein one of the first node and the second node is designated as a primary node and allocates and assigns the transaction a unique global sequence ID.

9. The computer-implemented method of claim 4, wherein the first node is an initiator of the transaction and wherein the computer-implemented method further comprises:
    the first node sending a commit message to the second node, wherein the commit message includes a first node-specific transaction ID generated by the first node and assigned to the transaction; and
    responsive to receiving the commit message, the second node performing other processing including:
        the second node performing said storing, in the first non-volatile MD log, the first MD update, and the second node performing said storing, in the second non-volatile MD log, the second MD update, wherein the first MD update is included in the first transaction record of the first non-volatile MD log, wherein the first transaction record includes the first node-specific transaction ID, wherein the second MD update is included in a second transaction record of the second non-volatile MD log, wherein the second transaction record includes the first node-specific transaction ID.

10. The computer-implemented method of claim 9, wherein the second node fails to return an acknowledgement to the first node regarding completion of processing of the commit message, and wherein responsive to failing to receive the acknowledgement of the commit message from the second node, the first node performs second processing including:
the first node storing, in a third transaction record of the first non-volatile MD log, the first MD update wherein the third transaction record includes the first node-specific transaction ID; and
the first node storing, in a fourth transaction record of the second non-volatile MD log, the second MD update wherein the fourth transaction record includes the first node-specific transaction ID.

11. The computer-implemented method of claim 10, further comprising:
determining that the first pair of transaction records, including the first transaction record and the second transaction record, is a duplicate of a third pair of transaction records, including the third transaction record and the fourth transaction records, wherein said determining determines that the first pair and the third pair are duplicates in accordance with the first transaction record, the second transaction record, the third transaction record and the fourth transaction record, wherein the first transaction record, the second transaction record, the third transaction record and the fourth transaction record include the first node-specific transaction ID.

12. The computer-implemented method of claim 11, further comprising:
discarding and/or invaliding one of the first pair and the third pair.

13. The computer-implemented method of claim 3, wherein the first MD update is stored in the first transaction record of the first non-volatile MD log, wherein the second MD update is stored in the second transaction record of the second non-volatile MD log, wherein the system includes a second node, wherein a system event causes the first node and the second node to reboot, wherein the first node completes rebooting and restarting prior to the second node, and wherein the first node performs said first processing to recover MD updates from the first non-volatile MD log and the second non-volatile MD log after said rebooting and said restarting prior to the second node.

14. The computer-implemented method of claim 13, wherein said first processing includes restoring MD updates from the first non-volatile MD log to the first volatile MD log of the first node, and wherein said first processing includes restoring MD updates from the second non-volatile MD log to the second volatile MD log.

15. The computer-implemented method of claim 14, wherein said first processing includes:
determining whether a third transaction record of the first non-volatile MD log is not associated with a counterpart transaction record of the second non-volatile MD log; and
responsive to determining the third transaction record is not associated with a counterpart transaction record of the second non-volatile MD log, determining that the third transaction record denotes a second transaction with only MD updates stored in the first non-volatile MD log and not the second non-volatile MD log and populating the first volatile MD log of the first node with MD updates of the third transaction record.

16. The computer-implemented method of claim 14, wherein said first processing includes:
determining whether a third transaction record of the first non-volatile MD log is part of a disconnected pair where a counterpart transaction record of the second non-volatile MD log has already been destaged from the second non-volatile MD log; and
responsive to determining the third transaction record is part of a disconnected pair, populating the first volatile MD log of the first node with MD updates of the third transaction record.

17. The computer-implemented method of claim 14, wherein a third transaction record is included in a second transaction, wherein an initiator is one of the first node and the second node and wherein a non-initiator is a remaining one of the first node and the second node which is not the initiator, and wherein said first processing includes:
determining whether the third transaction record of the first non-volatile MD log is part of a torn pair where a counterpart transaction record of the second non-volatile MD log was not persisted due to a failure of the non-initiator, wherein the non-initiator persists the third transaction record and failed prior to persisting the counterpart transaction record to the second non-volatile MD log; and
responsive to determining the third transaction record is part of a torn pair, discarding and invaliding the third transaction record and not restoring MD updates of the third transaction record to the first volatile MD log of the first node.

18. A system comprising:
one or more processors; and
a memory comprising code stored thereon that, when executed, performs a method comprising:
receiving, at a first node of a system, a request, wherein the request is a transaction comprising a plurality of MD (metadata) updates including a first MD update of a first MD update type and including a second MD update of a second MD update type, wherein the first MD update type is included in a first set of MD update types, and wherein the second MD update type is included in a second set of MD update types;
in response to receiving the request, performing processing including:
storing, in a first volatile MD log, the first MD update;
storing, in a second volatile MD log, the second MD update;
storing, in a first non-volatile MD log, the first MD update; and
storing, in a second non-volatile MD log, the second MD update, wherein each MD update stored in the first volatile MD log and the first non-volatile MD log has a first corresponding MD update type included in the first set, and wherein each MD update stored in the second volatile MD log and the second non-volatile MD log has a second corresponding MD update type included in the second set, wherein each MD update type of the first set is different from each MD update type in the second set; and performing first processing by the first node to recover MD updates from the first non-volatile MD log and the second non-volatile MD log, said first processing including:
- receiving a first transaction record from the first non-volatile MD log;
- responsive to determining the first transaction record has a valid corresponding transaction record in the second non-volatile MD log, determining whether the first transaction record and the valid corresponding transaction record denote a first pair which is a duplicate transaction of a second pair of transaction records, wherein the second pair of transaction records includes one transaction record from the first non-volatile MD log and another transaction record from the second non-volatile MD log; and
- responsive to determining the first pair is not a duplicate of the second pair, populating the first volatile MD log and the second volatile MD log of the first node in accordance with MD updates of the first pair, and otherwise discarding and invalidating the first pair.

19. A non-transitory computer readable medium comprising code stored thereon that, when executed, performs a method comprising:

receiving, at a first node of a system, a request, wherein the request is a transaction comprising a plurality of MD (metadata) updates including a first MD update of a first MD update type and including a second MD update of a second MD update type, wherein the first MD update type is included in a first set of MD update types, and wherein the second MD update type is included in a second set of MD update types;

in response to receiving the request, performing processing including:
- storing, in a first volatile MD log, the first MD update;
- storing, in a second volatile MD log, the second MD update;
- storing, in a first non-volatile MD log, the first MD update; and
- storing, in a second non-volatile MD log, the second MD update, wherein each MD update stored in the first volatile MD log and the first non-volatile MD log has a first corresponding MD update type included in the first set, and wherein each MD update stored in the second volatile MD log and the second non-volatile MD log has a second corresponding MD update type included in the second set, wherein each MD update type of the first set is different from each MD update type in the second set; and performing first processing by the first node to recover MD updates from the first non-volatile MD log and the second non-volatile MD log, said first processing including:
- receiving a first transaction record from the first non-volatile MD log;
- responsive to determining the first transaction record has a valid corresponding transaction record in the second non-volatile MD log, determining whether the first transaction record and the valid corresponding transaction record denote a first pair which is a duplicate transaction of a second pair of transaction records, wherein the second pair of transaction records includes one transaction record from the first non-volatile MD log and another transaction record from the second non-volatile MD log; and
- responsive to determining the first pair is not a duplicate of the second pair, populating the first volatile MD log and the second volatile MD log of the first node in accordance with MD updates of the first pair, and otherwise discarding and invalidating the first pair.

* * * * *